(12) United States Patent
Maierbacher et al.

(10) Patent No.: US 11,101,888 B2
(45) Date of Patent: Aug. 24, 2021

(54) SYSTEM FOR THE TRANSMISSION OF DATA

(71) Applicant: OSRAM GmbH, Munich (DE)

(72) Inventors: Gerhard Maierbacher, Munich (DE); Bernhard Siessegger, Unterschleissheim (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 16/648,672

(22) PCT Filed: Sep. 19, 2018

(86) PCT No.: PCT/EP2018/075394
§ 371 (c)(1),
(2) Date: Mar. 19, 2020

(87) PCT Pub. No.: WO2019/057795
PCT Pub. Date: Mar. 28, 2019

(65) Prior Publication Data
US 2020/0228203 A1   Jul. 16, 2020

(30) Foreign Application Priority Data

Sep. 19, 2017 (DE) .................... 10 2017 008 795.4
May 30, 2018 (EP) .................... 18175229

(51) Int. Cl.
*H04B 10/00* (2013.01)
*H04B 10/116* (2013.01)
(Continued)

(52) U.S. Cl.
CPC .......... *H04B 10/116* (2013.01); *B25J 19/025* (2013.01); *H04B 10/1149* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 4,570,065 A   2/1986   Pryor
7,266,281 B1  9/2007   Flatau
(Continued)

FOREIGN PATENT DOCUMENTS

DE   19815389 A1   10/1999
DE   10031770 A1   1/2002
(Continued)

OTHER PUBLICATIONS

International Search Report based on Application No. PCT/EP2018/075394, dated Apr. 29, 2019, 5 pages English Translation + 8 pages (for reference purpose only).
(Continued)

*Primary Examiner* — Daniel G Dobson
(74) *Attorney, Agent, or Firm* — Viering, Jentschura & Partner MBB

(57) ABSTRACT

A system may involve transmitting data via a light-based data link. The aim of the invention is to establish a data connection which is as simple and efficient as possible. In order to achieve this, the system comprises various components which deflect the light containing the data and distribute it in a targeted manner. The invention also relates to various fields of application for the system, such as mechanical joints and robot joints, rail systems and luminaires.

19 Claims, 28 Drawing Sheets

(51) Int. Cl.
*B25J 19/02* (2006.01)
*H04B 10/114* (2013.01)
*H04J 14/00* (2006.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118; H04B 10/80; H04B 10/801; H04B 10/803
See application file for complete search history.

(56) References Cited

U.S. PATENT DOCUMENTS

| | | | |
|---|---|---|---|
| 2008/0069495 | A1 | 3/2008 | Hirohashi et al. |
| 2009/0154936 | A1 | 6/2009 | Schierling et al. |
| 2010/0202782 | A1* | 8/2010 | Stark .................... G02B 6/4214 398/142 |
| 2011/0262137 | A1 | 10/2011 | Davidson et al. |
| 2016/0329959 | A1 | 11/2016 | Britz et al. |
| 2017/0307836 | A1 | 10/2017 | Iwasaki et al. |
| 2017/0309169 | A1 | 10/2017 | Ishizaki et al. |
| 2018/0169872 | A1 | 6/2018 | Okamoto |
| 2019/0097731 | A1* | 3/2019 | Ide ....................... H04B 10/671 |

FOREIGN PATENT DOCUMENTS

| | | |
|---|---|---|
| DE | 20221024 U1 | 2/2005 |
| DE | 202017102463 U1 | 7/2018 |
| EP | 0227835 A1 | 7/1987 |
| EP | 1134910 A2 | 9/2001 |
| EP | 2073406 A1 | 6/2009 |
| EP | 3229388 A1 | 10/2017 |
| WO | 0221730 A2 | 3/2002 |
| WO | 2014113451 A1 | 7/2014 |
| WO | 2017125167 A1 | 7/2017 |

OTHER PUBLICATIONS

Horst, F.; "Das für den Menschen sichtbare Spektrum (Licht)"; Wikipedia; 1 page; retrieved on Mar. 19, 2020 from https://de.wikipedia.org/wiki/Licht#/media/File:Electromagnetic_spectrum_-de_c.svg.

Wikipedia; "Lichtleiter"; 2 pages English Translation + 2 pages; retrieved on Mar. 19, 2020 from https://de.wikipedia.org/wiki/Lichtleiter.

Wikipedia; "Glasfaser", 9 pages English Translation + 9 pages; retrieved on Mar. 19, 2020 from https://de.wikipedia.org/wiki/Glasfaser.

Wikipedia; "Polymere optische Faser"; 4 pages English Translation + 5 pages; retrieved on Mar. 19, 2020 from https://de.wikipedia.org/wiki/Polymere_optische_Faser.

* cited by examiner

FIG 25
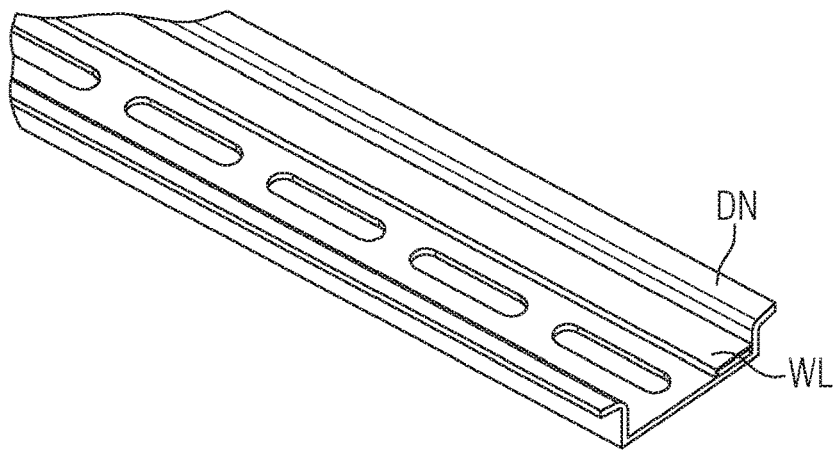
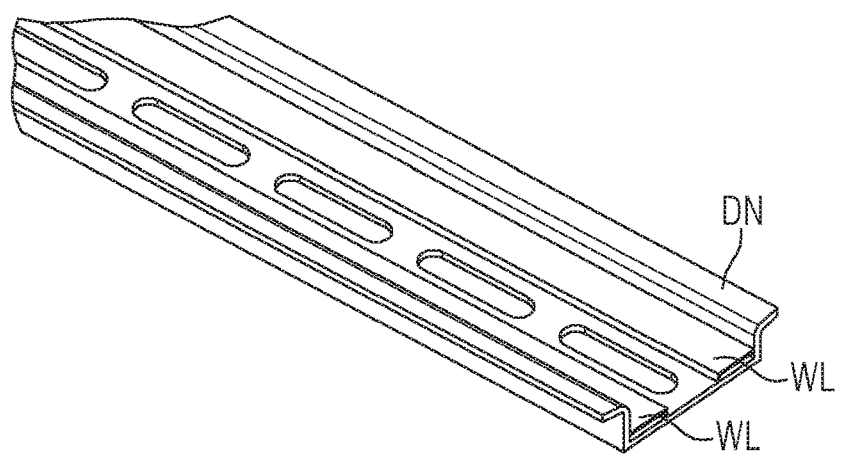
FIG 26
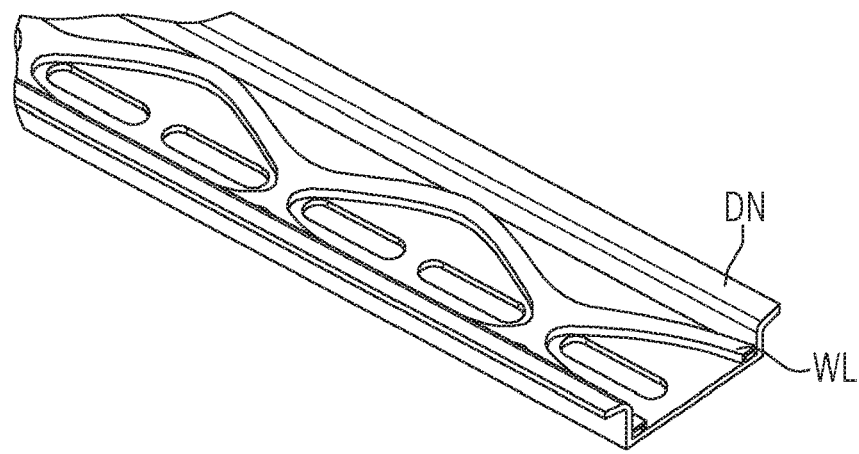

FIG 30
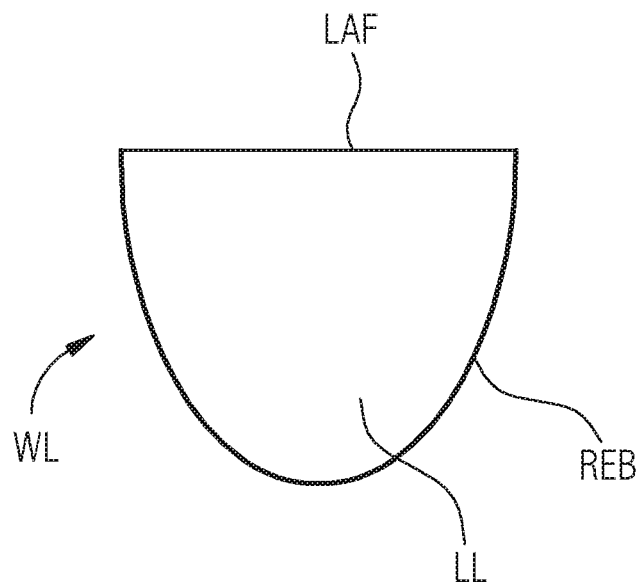
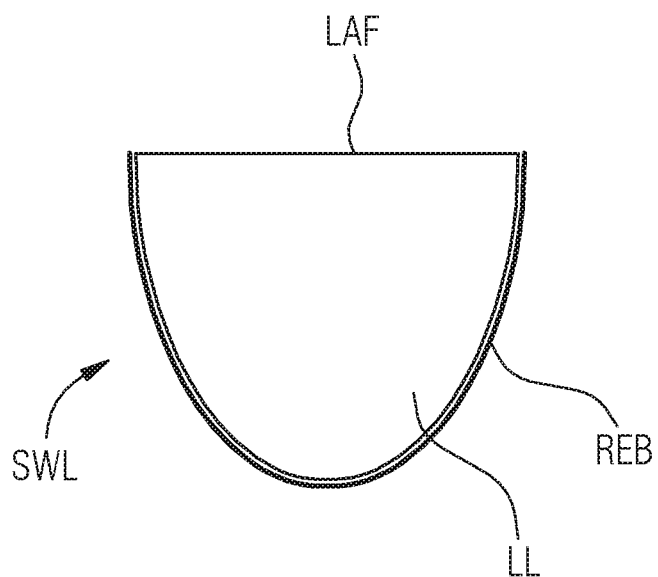

FIG 32
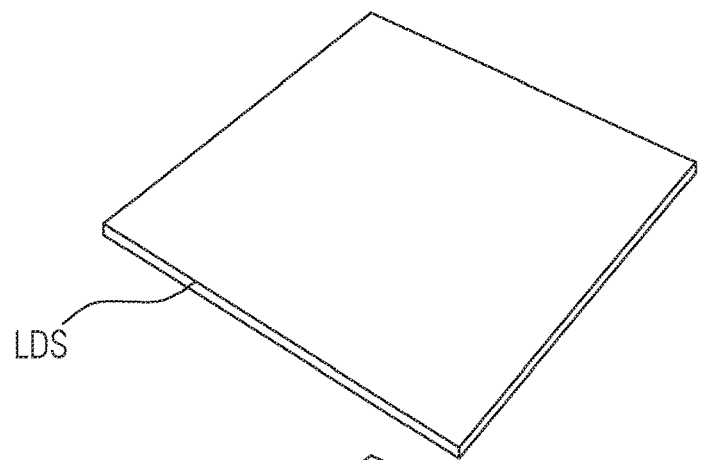
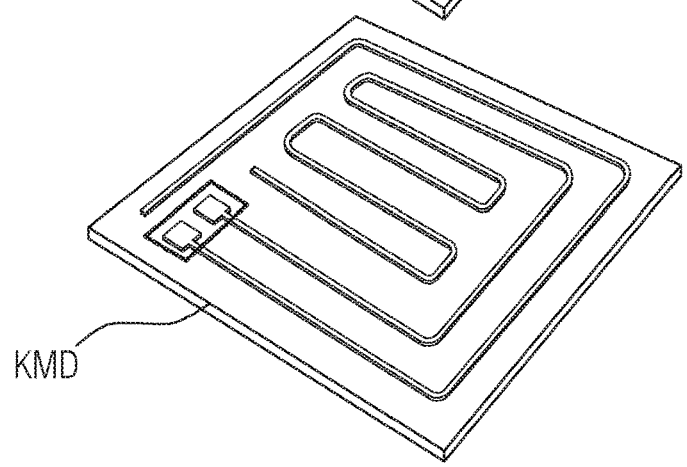
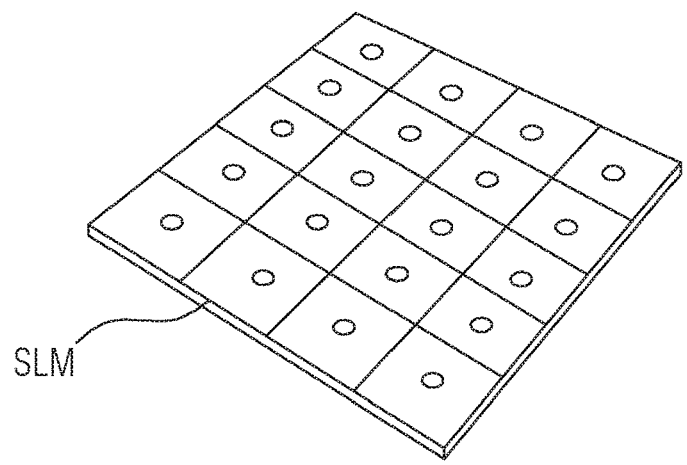

SYSTEM FOR THE TRANSMISSION OF DATA

CROSS-REFERENCE TO RELATED APPLICATIONS

The present application is a national stage entry according to 35 U.S.C. § 371 of PCT application No.: PCT/EP2018/075394 filed on Sep. 19, 2018; which claims priority to German Application No.: 10 2017 008 795.4, which was filed on Sep. 19, 2017 and also European Application No.: 18175229.6 filed on May 30, 2018; all of which are incorporated herein by reference in their entirety and for all purposes.

TECHNICAL FIELD

The invention is concerned with a system for transmitting data.

BACKGROUND

Wireless communication is ubiquitous and there is an ever increasing need for high-speed mobile data connection. The frequency spectrum for radio-based wireless communication is becoming a rare resource. Therefore, in the near future, radio-based communication technologies may be supplemented or even replaced by optical wireless communication (OWC). In optical wireless communication, light is used as a medium for the data transmission. Visible light (visible light communication, VLC), infrared (IR), near infrared (NIR) or light of other wavelengths can be used for the transmission.

At the same time, light-based transmission is insensitive to EMI. This is of interest for use in industrial environments, for example, where radio connections can be disturbed by electric motors, strong magnetic fields and electric welding work, for instance.

Light cannot penetrate, or can penetrate only with very great difficulty, through obstacles such as walls and doors, for example. This property can be exploited to make available a wireless communication technology locally and in a manner safeguarded against eavesdropping. This would be of interest for example for conference rooms, or for devices having increased security requirements.

On account of the properties of light, a line of sight (LoS) is for light-based data transmission. Shading, for example caused by the human body, and mobility, for example caused by movement of components to which information is intended to be transmitted, pose a technical challenge requiring a suitable solution.

In order to maintain a line of sight in virtually any arbitrary orientation of the body or of the device, multidirectional transmitter/receiver units are required. Minimizing a number of components and the extent of the wiring between the components is helpful for reducing costs. In order to achieve this multidirectionality, light-guiding materials are used.

In today's world, robots are found everywhere in factories, industrial installations and other producing units. In conventional producing units, a plurality of robots or groups of robots are grouped together to form production cells. Information has to flow to these production cells. The information concerns for example production flows, information regarding the cooperation of identical or different robots, and of course also information defining the task of each robot. This then generally necessitates a bidirectional information flow from the robot to the superordinate controller, and from the controller to the robot. This information is normally transmitted in wired fashion. There are also wireless systems such as WLAN, for example, but via wireless systems the information flow is often subjected to very great interference. The conditions in industrial production halls give rise to very strong interference fields that may be of electromagnetic or electrostatic nature. These interference fields have a very disadvantageous effect on the information flow if wireless radiofrequency-based systems are used. Therefore, wired systems such as LAN cables or the like are usually used in such production environments. Since conventional industrial robots consist of a number of movable joints of various types, the problem arises of making this information available across the movable joints to the corresponding locations in the robot.

FIG. 1 shows a known industrial robot as an example. The known industrial robot has a base 11, to which a first link 13 is secured. The first link 13 is connected to a first joint 14, to the other side of which a second link 15 is attached. The link can be rotated by the angle $\theta_1$. A second joint 16 is secured to the end of said second link, said second joint in turn being connected to a third link 17. The joint can be rotated by the angle $\theta_2$. The first and second joints are therefore rotary joints. A third joint 18 is secured to the third link 17. The third joint 18 is a rotary joint which can simultaneously perform a translational motion. The joint can be rotated by the angle 64. Gripping pincers 20 as an effector are connected to the joint 18 and can in turn carry out translational movements in space ($X_3$, $X_4$, $X_t$, $Y_t$, $Z_t$). FIG. 2 likewise shows an industrial robot having a base 21 and various rotary joints 22, 24, 26, 28 and 30. Information for controlling the robot has to be transmitted via all these joints. For this purpose, highly flexible cables are used nowadays since, after all, an industrial robot is constantly in motion and the cables are therefore subject to very great movement loading. Even in the case of highly flexible cables of very high quality, they have to be exchanged at regular intervals since the individual cores can break and then prevent or disturb the information flow. In order to prevent that, the cables are therefore exchanged at regular intervals. Since the cables are very expensive, the problem of high maintenance outlay arises.

It is desirable to improve the maintenance outlay for such a system for transmitting data and to make it more cost-effective.

SUMMARY

The object is achieved by a system for transmitting data including a transmitter, which emits light-based signals, a receiver, which receives the light-based signals, at least one medium for transmitting and directing the light, wherein the transmitter and the receiver are positionable relative to one another (in locally bound or adjustable and/or movable fashion). Replacing wired communication with light-based communication means that the maintenance outlay for exchanging network cables can be obviated and robust, long-lived and low-maintenance communication can be established.

In a non-limiting embodiment, the transmitter is also simultaneously a receiver, and the receiver is also simultaneously a transmitter. Thus, bidirectional communication can advantageously be established in a simple and cost-effective manner.

In a non-limiting embodiment, in this case the transmitter and the receiver include an optoelectronic element. The latter can convert the light modulated with data into electrical signals particularly efficiently.

In one embodiment, the transmitter furthermore includes a light output coupling surface. The generated light can be passed on by the light output coupling surface particularly efficiently, e.g. to an optical waveguide.

In a further embodiment, the receiver includes a light input coupling surface. By means of the light input coupling surface, the light can be received and processed further with high efficiency. This therefore advantageously increases the operational reliability.

In another embodiment, the transmitter and also the receiver each include a light output coupling surface and a light input coupling surface. This means that the transmitter and also the receiver are in each case structurally identical transceiver units that advantageously ensure bidirectional communication.

In a specific embodiment, the light output coupling surface and the light input coupling surface can be arranged in different spatial planes. Thus, the system advantageously becomes particularly flexible in terms of adaptation to specific stipulations for a specific arrangement.

In a further embodiment, the light output coupling surface and the light input coupling surface are arranged on different housing sides of the transmitter and/or of the receiver. This likewise contributes to increasing the flexibility of the data transmission of a specific arrangement, and is therefore likewise advantageous.

In a non-limiting embodiment, the transmitter is configured in such a way that the light radiated by the optoelectronic element is taken up by the light output coupling surface and emitted via the entire light output coupling surface. This advantageously ensures a particularly high efficiency of part of the transmission link.

In a further embodiment, the transmitter and/or the receiver are/is connected to a light coupling element, which is in turn connected to an optical waveguide. This measure once again increases the efficiency of the transmission of light between the components. The light coupling element can advantageously be an optical gel, for example, which is arranged between the light coupling surfaces and ensures a particularly good and clean optical transmission.

In a further embodiment, the optical waveguide includes a light output coupling surface. This likewise advantageously ensures efficient transfer of the light from one medium to the other.

In a further embodiment, a reflective element is provided, which reflects the light radiated by the transmitter, such that said light can be received by the receiver. In specific configurations, this can advantageously simplify the communication and reduce the number of components used.

In a further embodiment, a joint of a robot is arranged between the transmitter and the receiver, and the transmitter is connected to an input link of the joint, and the receiver is connected to an output link of the joint. Particularly advantageously, simple and robust communication across the joints of a robot can be established by means of this measure. Saving network cables means that the maintenance outlay for such machines is considerably reduced and the operating costs are reduced.

In one embodiment for robot joints, the optical waveguide is configured spatially in such a way that it correlates with the motion of the joint. As a result, the air gap that has to be transversed by the light between the transmitter and the receiver can be considerably reduced, and the communication advantageously becomes significantly less susceptible to interference. In a non-limiting embodiment, in this case, the optical waveguide is embodied in ring-shaped fashion in the case of a rotary motion of the joint, and is embodied in rod-shaped fashion in the case of a translational motion of the joint. This ensures requirements above in a particularly simple and cost-effective manner.

In another embodiment, the input link, the joint, and the output link are configured in hollow fashion, and the transmitter and receiver are arranged in such a way that the light radiates internally through the input link, the joint and the output link from the transmitter to the receiver. In the case of twisting joints, this is the simplest and most effective form of establishing communication across the joint.

In one advantageous embodiment, the optical waveguide includes a light guide and/or an optical fiber. By virtue of this measure, the transmissivity of the optical waveguide is increased and the efficiency of the transmission link is improved.

In a further embodiment, the optical waveguide is a side emitter. Side emitters can advantageously be used for a particularly large number of purposes, particularly if the light has to traverse relatively long distances.

In one embodiment of the side emitter, the side emitting fiber is embedded into a light guide having a parabolically shaped cross section, which can also be composed of a plurality of parabolas, and the outer surface of the parabola is reflectively coated. As a result, the light emitted by the fiber is collected and emitted again as a substantially parallel light beam, which advantageously contributes to an increased efficiency.

In another embodiment of the side emitter, the side emitting fiber is enveloped by a light-guiding material, an optical cladding, and this configuration is embedded into the parabolically shaped light guide. This embodiment is more complex, but also more efficient, since it is possible to optimize the material transitions for the light.

In another embodiment of the side emitter, the optical waveguide includes a parabolically shaped light guide, wherein the outer surface of the parabola is reflectively coated, and the light exit surface of the parabola has an optically effective coating. The transmission efficiency can likewise be improved by the coating, which advantageously contributes to a better overall efficiency.

In another embodiment of the side emitter, the optical waveguide includes a parabolically shaped light guide, wherein the outer surface of the light guide has an optically effective coating, and the outer surface of the parabola is reflectively coated, and the optical waveguide includes light-scattering structures. In this embodiment, the optically effective coating is led around the entire light guide, and, on said coating, the reflective coating is then once again applied in the region of the parabola. This is more complex, but in specific cases can likewise contribute to a better performance of the optical waveguide.

In another embodiment, the system for transmitting data is designed for communication within a switchgear cabinet. This system no longer has anything to do with robot joints since what is involved here is communication within a switchgear cabinet, e.g. in an industrial hall. Light-based communication can likewise be used very advantageously here.

In one embodiment, here the medium for directing the light is an optical waveguide which is embedded into a mounting rail. The mounting rail is a DIN rail for switchgear cabinets. This constitutes a very simple and also efficient possibility for establishing light-based communication in a switchgear cabinet that uses DIN rails.

In a non-limiting embodiment, the transmitter and the receiver are combined in a transceiver unit for the mounting rail, which, as a component of the mounting rail, is connectable to the latter and can couple light into the optical waveguide and can receive light from the latter for the purpose of the light-based communication. By means of this measure, it is possible furthermore to use a standard DIN rail having merely an additional optical waveguide. Said rail is then shortenable and adaptable to the local conditions in a simple manner as usual. By virtue of the fact that the transceiver unit is designed as a normal DIN rail component, it can advantageously be fitted to any location of the DIN rail and the system is thus very flexible. The transceiver unit of the DIN rail includes a communication connection such as e.g. an Ethernet connection. However, the communication connection can also be a serial connection e.g. according to the USB standard.

In a further embodiment, each component of the mounting rail includes a transceiver unit, which can communicate with the transceiver unit for the mounting rail via the optical waveguide. This measure makes it possible to establish a network between the components of the mounting rail in a very simple manner, without the outlay for additional cabling.

In a further embodiment, the transceiver unit for the mounting rail includes an Ethernet connection. Thus, only one Ethernet cable per mounting rail is necessary for establishing a network connection.

In one embodiment, the optical waveguide extends along one inner edge of the mounting rail. This constitutes a very simple and cost-effective realization of a mounting rail.

In another embodiment, the optical waveguide extends separately along both inner edges of the mounting rail. This variant is likewise very simple and two independent channels can be realized by the two optical waveguides.

In a further variant, the optical waveguide extends as an integral part along both inner edges of the mounting rail. This variant has the advantage of greater flexibility with regard to the position of the light coupling surfaces of the components. Moreover, components such as residual current circuit-breakers can be incorporated into the mounting rail in both directions.

In a non-limiting embodiment, the optical waveguide is embodied as a side emitting optical waveguide. This has the advantage of greater light efficiency.

A mounting rail may include an optical waveguide, which mounting rail is part of the system for transmitting data for communication within a switchgear cabinet.

In another embodiment, the system for transmitting data is designed for communication from a luminaire to a subscriber in the illumination range of the luminaire. To that end, the system for communication is embodied as a communication module KMD. In this context, a subscriber is e.g. a terminal operated by human beings, such as e.g. a smartphone, a tablet or a laptop. However, a subscriber can also be an autonomously driving vehicle in a production environment or an industrial robot. This constitutes a simple and secure solution for establishing secure and fast.

Particularly advantageously, the communication module includes a transmitter with a coupled first optical waveguide, and includes a receiver with a coupled second optical waveguide. As a result, any transmission link can advantageously be optimized and can be operated with different wavelengths.

In a non-limiting embodiment, the optical waveguides are embodied as side emitting optical waveguides. This considerably increases the efficiency of the communication link.

Side emitting light guides can be embodied in various ways. In one embodiment, the side emitting optical waveguide includes a light-guiding fiber containing light-scattering structures. These are nanostructures or other light-scattering materials, in particular particles, which are embedded into the fiber. The fiber itself is composed of glass and has a coating composed of a polymer. In another embodiment, the light-guiding fibers have no coating. The light guide itself is likewise composed of a polymer that guides light well, such as PMMA, PVC or polycarbonate. In a non-limiting embodiment, the side emitting optical waveguide has a paraboloidal shape in order to align the emerging light in a parallel manner. In one embodiment, the paraboloidal side of the side emitting optical waveguide is provided with a reflective coating on the exterior. Said reflective coating ensures that the light scattered by the light-scattering structures is deflected as effectively as possible to the light exit surface of the side emitting optical waveguide. The light guide is accordingly like an elongated paraboloidal reflector. In a further embodiment, the side emitting optical waveguide has no light-guiding fibers at all, rather the light is directed solely by the material of the side emitting optical waveguide. In this embodiment, the side emitting optical waveguide itself includes light-scattering structures or particles in its material. In another embodiment, the side emitting optical waveguide may include a fluorescent coating.

In one embodiment, the communication module can be integrated into a luminaire. In this case, the communication module is arranged between a luminous module and a covering plate. The luminous module may include a multiplicity of LEDs. In this case, the communication module is transparent, such that the light emitted by the luminous module can pass through the communication module and the covering plate. Only at the locations of the side emitting optical waveguide is the communication module not transparent; rather, there the light required for communication is radiated in the direction of the covering plate.

In another embodiment, the system for transmitting data is designed for communication in a busbar system. In this case, the busbar system includes a securing system for various modules which, when they are secured to a busbar system, obtain a supply power via at least two electrical conductors, and also have a data connection by way of light-based communication by way of an optical system extending in the busbar system.

In one embodiment, the optical system is embodied in tubular fashion, wherein the light used for communication is guided within this tube. In order to couple out parts of the light used for communication and to incorporate the modules connected to the busbar system into the network, partly transmissive mirrors are arranged at regular intervals within this tube. In one embodiment, said mirrors are arranged at an angle of 45°. The light transmissivity of said mirrors is dimensioned such that a small part of the light is reflected by the mirror, and a larger part of the light passes through the mirror.

In one embodiment, the light-based communication system includes a feed-in point for the light-based communication. Said feed-in point can be connected to a network such as an Ethernet network, for example, and converts the data received from the network into modulated light which it feeds into the tube system. The system may include further access points, which are incorporated into the network via the input coupling points and supply external devices with network coverage. In one embodiment, the tubes are provided with a reflective coating on the inside, which reflects the light fed into the tube. As a result, it is possible that the feed-in point need not radiate directional light, but rather can be embodied very simply.

In another embodiment, the light-based communication system includes an elongate light guide instead of the tube. The light guide in turn is composed of a highly transparent material such as PMMA, polycarbonate or the like. The light guide is embodied such that it has constrictions at regular intervals, said constrictions each forming a light-guiding surface. Said light-guiding surface directs part of the light guided in the light guide laterally out of the light guide in order to form there a feed-in point for the light-based communication. In a non-limiting embodiment, in this environment, coupling elements are used which likewise consist of an optical material and connect the light guide and the feed-in point, or the modules connected to the busbar system, as far as possible without any gaps.

In another embodiment, the system for light-based communication is formed from segments that can be strung together. In order to bring the light-based communication from one segment to the next, provision is made of connection elements connected to light-guiding fibers. The connection elements are situated at the end side of the segments in the longitudinal direction, and are exactly opposite one another given correct arrangement of the segments. As output coupling point, in each segment at least one output coupling element is provided, which is coupled to the connection elements via the light-guiding fibers. The connection elements can have a specific surface or coating at the light entrance and/or exit surface. In the simplest case, this can be a roughening, but provision can also be made of a specific polymer coating, a fluorescent coating, or a geometric layer. In another embodiment, the connection element includes a converging lens at the light entrance and/or exit surface, said lens deflecting the emerging light and radiating it in a parallel manner. Entering light is likewise collected by said lens and concentrated at the location at which the connection element is coupled to the light-guiding fiber.

The output coupling elements can also be configured in various ways. In one embodiment, the output coupling element is fashioned such that only a small part of the light is directed sideward toward the outside, while a larger part of the light is coupled through the output coupling element into the light-guiding fiber connected to the output coupling element. In another embodiment, the output coupling element is fashioned such that a large part of the light is directed sideward toward the outside.

In another embodiment, the light-based communication system may include amplifier elements arranged in each case at the beginning and/or end of a segment. Said amplifier elements receive the communication light of a segment, convert it or amplify it, and guide it into a further segment. If the light is converted into an electrical signal, it is converted back into light again by a further amplifier element of the next segment and is fed into the next segment. The amplifier elements are provided with a data connection for this purpose. The data connection can be of optical or electrical nature. In the case of the electrical data connection, the communication light is received by an amplifier element, converted into an electrical signal, and transmitted to the second amplifier element via the data line, said second amplifier element converting said signal once again into light, and feeding it into the next segment. In an optical data connection, the light taken up by the amplifier element is amplified and emitted via the optical data connection to the second amplifier element, which either feeds it directly into the next segment, or once again amplifies it and then feeds it into the next segment. The amplifier elements can also be used to establish a busbar system, wherein different parts of the busbar point in different spatial directions. Moreover, by way of such a system, a plurality of busbars can be interconnected to form a busbar system. A switch is provided for this purpose, from which switch all the data connections lead out to the amplifiers in a star shape. In a non-limiting embodiment, said switch is then simultaneously embodied as a network feed-in point, and includes an Ethernet interface, via which the communication system for the busbar can be connected to a local network.

The use of the term "light-based" shall be defined briefly hereinafter: "light-based" is used synonymously with "using light". Light should be considered to be electromagnetic waves that are in a frequency range generally referred to as "light". This includes light visible to human beings, but also the longer and shorter wavelengths, that is to say infrared light and also ultraviolet light. Expressed in wavelengths, that is approximately the range of from 10 nm to 10 µm. An overview regarding classification can be found in the encyclopedia Wikipedia: https://de.wikipedia.org/wiki/Licht#/media/File:Electromagnetic_spectrum_-de_c.svg An "optoelectronic element" hereinafter is an element which can either generate or receive light-based signals. Part of an optoelectronic element here can be e.g. a light-emitting diode or a photodiode. However, a laser diode or a photoresistor can likewise be involved. An emission optical unit or reception optical unit that may be necessary can be part of the optoelectronic element.

Transmitter hereinafter is a device suitable for emitting light-based signals. A transmitter is therefore able to convert information input in it into light-based signals and to radiate them. A transmitter must accordingly include an optoelectronic element.

Receiver hereinafter is a device that works in the opposite direction to the transmitter. A receiver is able to convert light-based signals into information and to output it. A receiver must accordingly likewise include an optoelectronic element.

In practice, on account of the generally bidirectional communication, transmitter and receiver are usually used together, i.e. as a pair. Therefore, the two terms hereinafter also stand for a combined transceiver element.

The term light guides denotes transparent components, such as fibers, tubes or rods, which transport light over short or long distances. In this case, the light guiding is achieved by reflection at the interface of the light guide either by total internal reflection on account of a lower refractive index of the medium surrounding the light guide, or by reflective coating of the interface. See also: https://de.wikipedia.org/wiki/Lichtleiter.

Optical fibers are fibers composed of glass (https://de.wikipedia.org/wiki/Glasfaser) or plastics (https://de.wikipedia.org/wiki/Polymere_optische_Faser) having a high light guiding capability. They are used primarily for data transmission purposes.

A side emitting light guide or side emitting fiber is considered to be a light guide or a fiber which emits parts of the light along its elongate extent. This is achieved by virtue of the fact that, at the inner walls of the light guide, total internal reflection does not take place, rather light leakage occurs in a targeted manner and emits the light toward a side relative to the elongate extent of the light guide. Such light guides are also referred to hereinafter as side emitters. However, it may also be the case that the light is emitted not only in one spatial direction orthogonally to the elongate extent of the light guide, but also into a spatial plane. In this case, the elongate extent of the light guide is then orthogonal to said spatial plane.

An optical waveguide hereinafter is considered to be a guide which guides light and includes defined interfaces such as light input coupling surfaces and light output coupling surfaces. The optical waveguide therefore includes a light guide and/or an optical fiber.

An optical element hereinafter is considered to be any combination of one or more basic optical elements such as lenses, mirrors, diffractive optical elements, optical fibers, light guides and other conceivable optical elements. Light-guiding liquids can also form optical elements.

A light output coupling surface hereinafter is considered to be a surface of a light guide or of a transmitter which is provided for emitting the light on a predefined surface. That can be the diverted light in the case of a light guide, and the generated light in the case of a transmitter. The surface can be specially shaped, structured or coated for this purpose.

A light input coupling surface hereinafter is considered to be a surface of a light guide or receiver which is configured to couple light into the light guide or receiver. In order that this takes place as efficiently as possible, the surface can be specially shaped, structured or coated.

BRIEF DESCRIPTION OF THE DRAWINGS

Further advantages, features and details of various embodiments are evident on the basis of the following description and with reference to the drawings, in which identical or functionally identical elements are provided with identical reference signs. Here in the figures:

FIG. 25 shows two embodiments of a DIN rail equipped for light-based communication, FIG. 26 shows a further embodiment of a DIN rail equipped for light-based communication, FIG. 30 shows two subvariants of the third embodiment of the side emitting light guide, FIG. 32 shows the components of a luminaire upgraded for light-based communication.

Elements which are the same or of the same type, or which have the same effect, are provided with the same references in the figures.

The figures are respectively schematic representations and therefore not necessarily true to scale. Rather, relatively small elements, and in particular layer thicknesses, may be represented exaggeratedly large for illustration.

DETAILED DESCRIPTION

Figure 3:
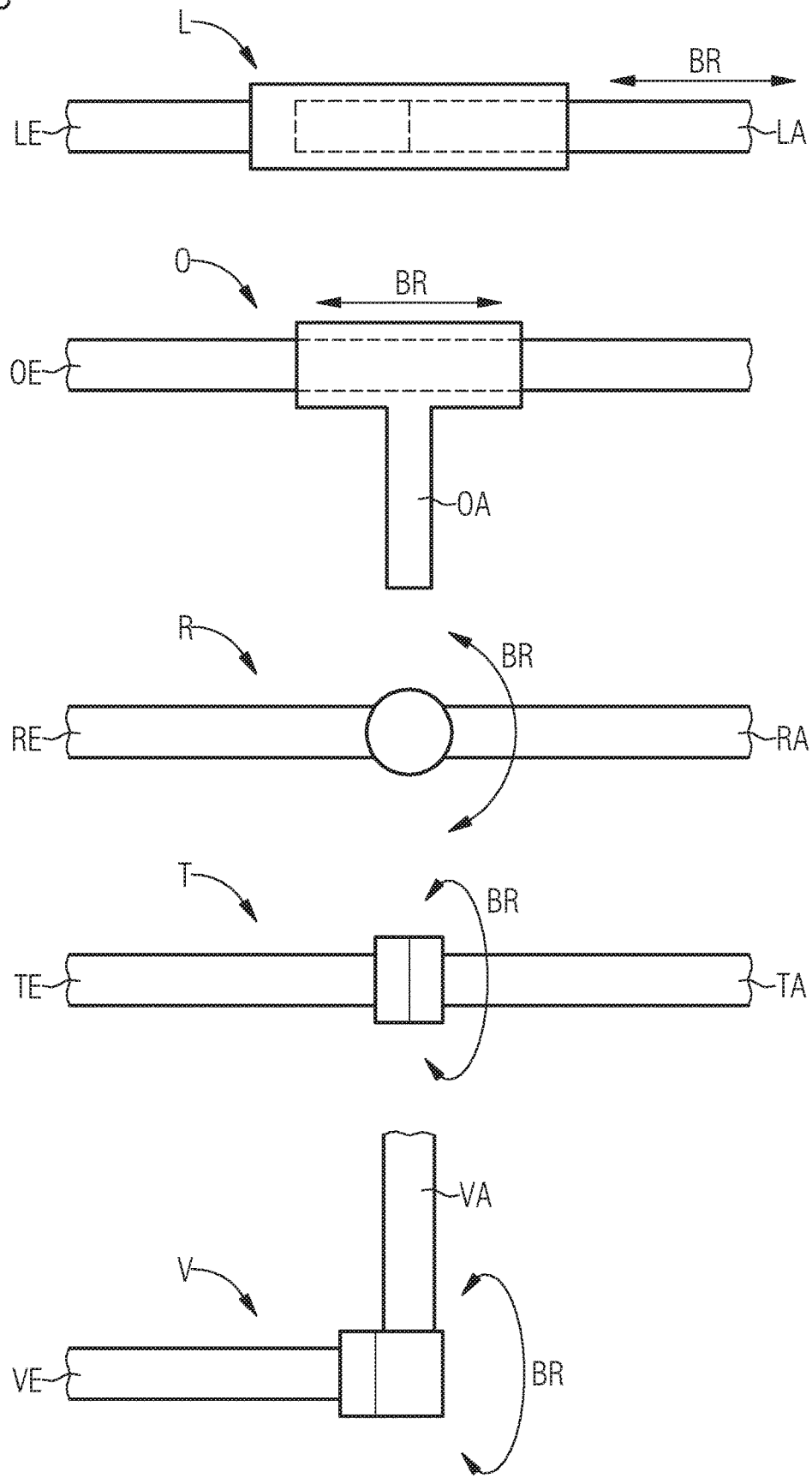
FIG. 3 shows an illustration of various conventional joints that are used in a robot.

FIG. 3 shows an illustration of various conventional joints used in a robot. A distinction is drawn here between translational and rotary joints.

A first type of joint L illustrated in FIG. 3 is a translational joint. The translational joint describes a straight line as direction of motion. This type of joint is therefore also referred to as a linear joint L. The translational joint L has an input link LE and an output link LA. The motion between input link LE and output link LA is rectilinear. The translational joint L thus permits only a rectilinear motion between the two connected links LE and LA. In this case, the axes of the input links LE and LA are identical with the axis of motion of the linear joint L.

A further translational joint is the orthogonal joint O. The orthogonal joint in turn has an input link OE and an output link OA. The motion between the input link OE and the output link OA is once again only rectilinear. However, the axis of the output link OA is rotated by 90° relative to the axis of the input link OE.

A first of the rotary joint types is the rotational joint R. The rotational joint R in turn includes an input link RE and an output link RA. In the case of the rotational joint, a circular motion is permitted as direction of motion. That is to say that the output link RA can effect only a circular motion relative to the input link RE. The angle between the axes of the input link RE and of the output link RA is altered during said circular motion. In this case, the axis of rotation of the rotational joint R is arranged orthogonally to the axes of the input link RE and of the output link RA in space. The main direction of motion is thus the same as the basic direction of motion in the case of the human knee or elbow joint. In this case, the rotary motion can cover a range of normally less than 360°. Motion latitudes of between 180° and 270° are customary.

A further type of rotary joint is the twisting joint T. The twisting joint T in turn includes an input link TE and an output link TA. Only a pure rotary motion is permitted between the input link TE and the output link TA. The direction of rotary motion thus runs in the axis of the two links TE and TA. The rotary motion can encompass 360° in this case, that is to say that the output link can be rotated relative to the input link like an axle.

The last joint shown in FIG. 3 is the revolving joint V. The revolving joint V in turn includes an input link VE and an output link VA. In this case, the axis of the output link VA is arranged perpendicular to the axis of the input link VE. The rotary motion between the output link VA and the input link VE is thus such that the perpendicular angle of the output link VA relative to the input link VE is maintained. One end of the output link VA thus describes a circular motion about the axis of the input link VE. The rotary motion can encompass 360° in this case.

Figure 4:
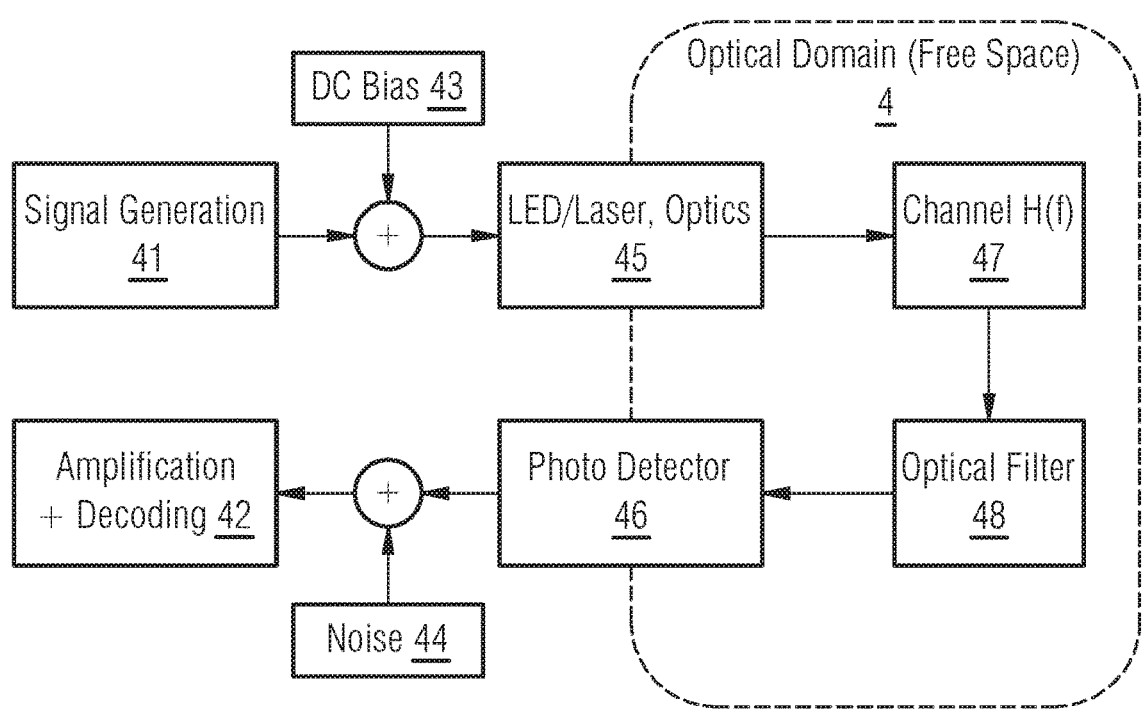
FIG. 4 shows a block diagram of a light-based communication system.

FIG. 4 shows a block diagram of the light-based communication system. The light-based communication system is divided into a hardware part fitted to the machine or to an external controller, and a part via which the communication via light takes place. This part is usually also referred to as an air gap since the communication is effected via the entirely normal atmosphere (the "air"). In the block diagram, the numeral 41 denotes the signal generation. Here the signal to be transmitted/transmission signal is generated, to which a DC voltage or a DC current is added in the next step. The resulting signal is then applied to a light-emitting optoelectronic element 45, in particular an LED or a laser. Said optoelectronic element converts the electrical signal into a modulated light signal. The parts 41, 43 and 45 are referred to as transmitter and are normally arranged in a transmitting unit or integrated into a control unit. Via the channel, generally the air gap, as illustrated in block 47, the modulated light then reaches an optical filter 48, which prefilters the light, and from there passes into a light-detecting optoelectronic element 46, in particular a photodiode, which generates an electrical signal once again from the light. The noise source in block 44 models additional noise that is additively superposed on the reception signal, e.g. thermal noise or shot noise, which is really present and cannot be suppressed. Finally, the signal is filtered, amplified and decoded in block 42. The block diagram thus shows the basic mechanisms of a light-based communication system. In this case, it is unimportant, of course, whether the light-based communication is carried out only across a robot joint or encompasses an entire room. In this case, for example, the information can be emitted by transmitters on the ceiling of the room, and can be received again at various locations in the room. In this case, it is unimportant whether the information is made available for an entire manufacturing cell, for a robot, or only for a joint of the robot. Depending on where the receiver is fitted, the information can reach any location directly or by means of additional optical elements (e.g. mirrors, light guides or optical fibers).

Figure 1:
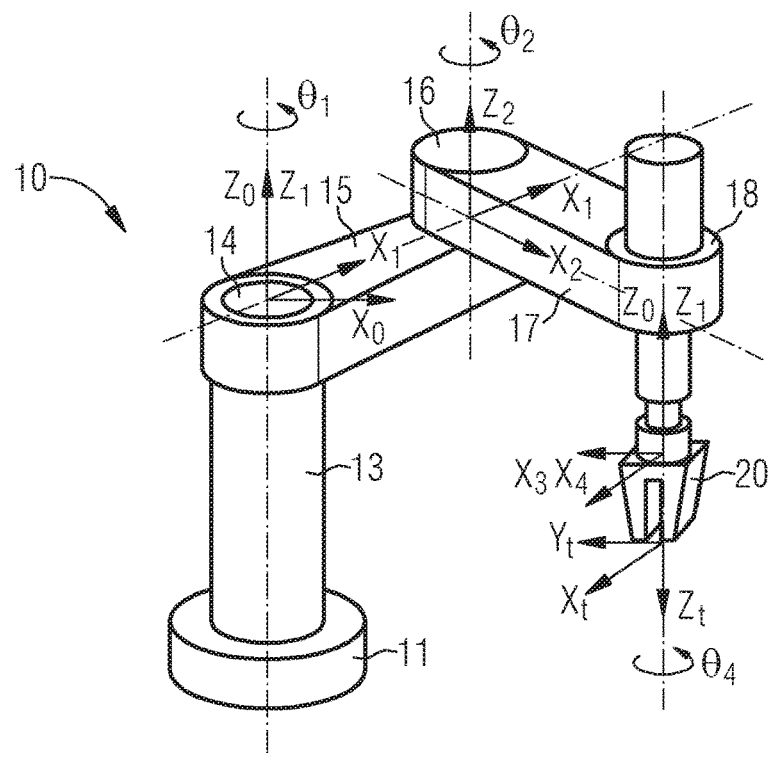
FIG. 1 shows an industrial robot with various joints and links.
Figure 2:
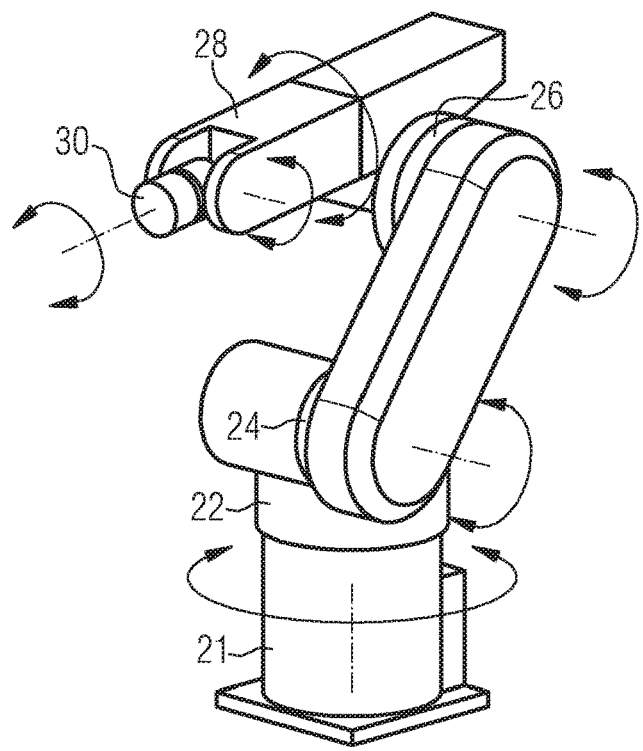
FIG. 2 shows a further industrial robot with various joints and links.
Figure 5:
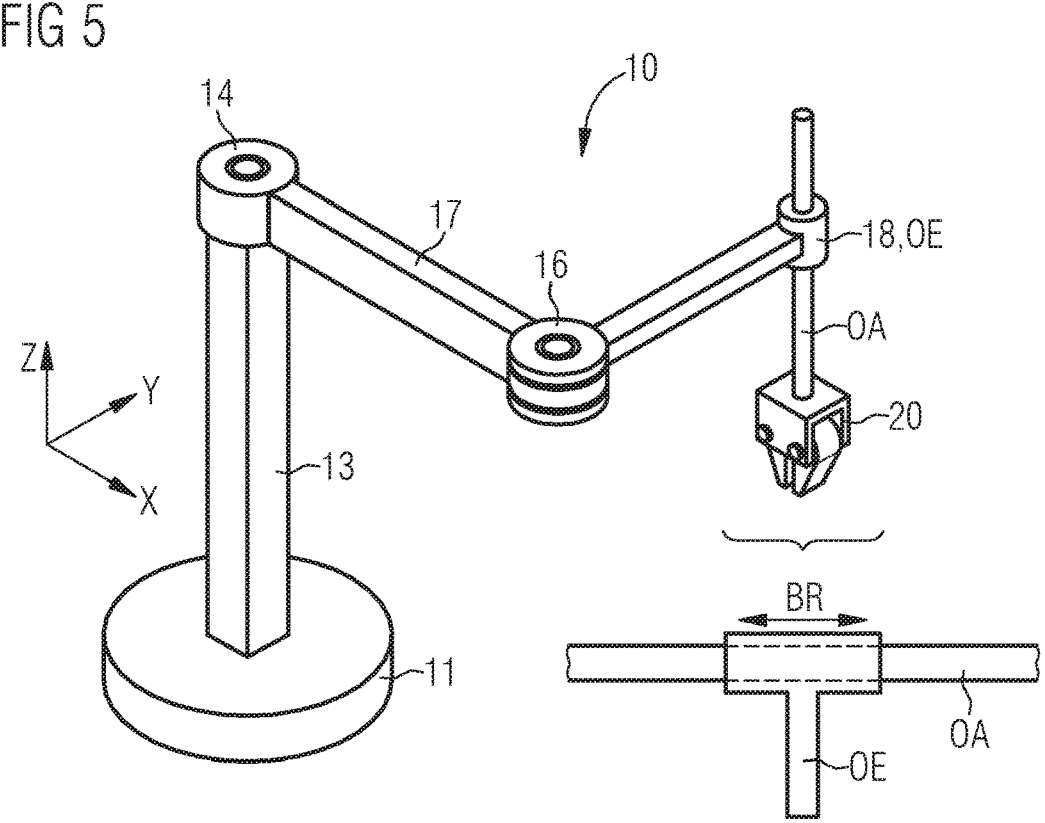
FIG. 5 shows the use of an orthogonal joint O on the basis of the example of the robot from FIG. 1.

FIG. 5 shows the use of an orthogonal joint O on the basis of the example of the robot from FIG. 1. The robot 10 from FIG. 1 has already been described above. The robot 10 includes an orthogonal joint as the last joint 18. The orthogonal joint includes an input link OE and an output link OA. In this case, input link OE is identical with the link 18. The output link OA is designated in the figure and here is a long rod which can be moved translationally relative to the input link, but can also be rotated in a rotary manner. An effector 20, pincers in this case, is fitted to the output link OA. The schematic illustration of the orthogonal joint O is depicted once again on the right-hand side of FIG. 5. In this case, the input link OE is the orthogonal link of the joint. In this case, the output link OA is a long rod which can be moved translationally, that is to say in an axis, relative to the input link. The direction BR of motion is included in the figure.

Figure 6:
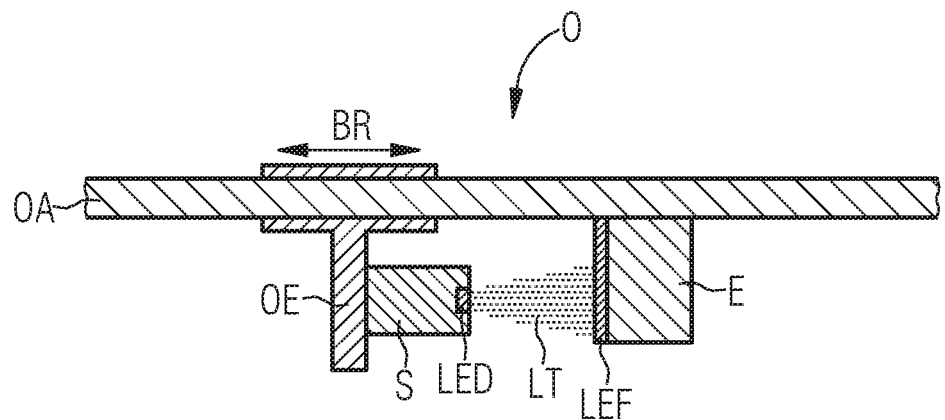
FIG. 6 shows a schematic illustration of an orthogonal joint O suitable for light-based signal transmission.

FIG. 6 shows a schematic illustration of an orthogonal joint O suitable for light-based signal transmission. For this purpose, some components are added to the orthogonal joint. The orthogonal joint O still consists of an orthogonal input link OE and a rod-shaped output link OA. A transmitter S is additionally fitted to the input link OE. A receiver E is in turn fitted to the output link OA. The receiver E includes a light-sensitive surface. Said light-sensitive surface is also referred to hereinafter as light input coupling surface LEF. The optical emitter S radiates the light LT at a specific angle by means of a light-emitting diode or a laser LED. Said light LT impinges on the light-sensitive surface LEF of the receiver E. By virtue of the fact that the light is radiated in the same spatial direction as the direction of motion of the joint, the light radiated by the transmitter S can always be received by the light-sensitive surface LEF of the receiver E, in any position of the joint O. It should be pointed out that the transmitter S like the receiver E can also be a combined transceiver element SE in order to ensure bidirectional communication.

Figure 7:
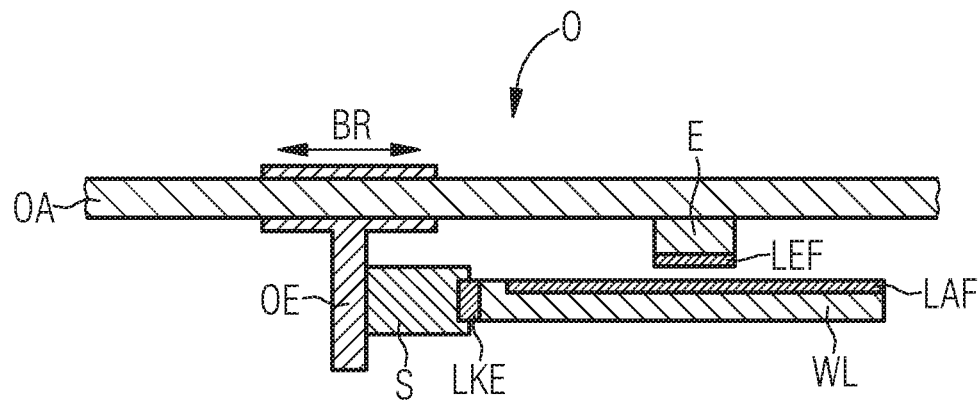
FIG. 7 shows a further embodiment of an orthogonal joint O.

FIG. 7 shows a further embodiment of an orthogonal joint O. Here, too, there is an input link OE and an output link OA. The orthogonal input link OE once again has a transmitter S. However, the transmitter S does not radiate the light LT directly, rather, the light is coupled into an optical waveguide WL via a light coupling element LKE. The optical waveguide WL in turn has a light exit surface LAF. The light radiated by the transmitter S then passes via the light coupling element LKE into the optical waveguide WL, is distributed there on a longitudinal axis corresponding to the direction of motion of the orthogonal joint, and is radiated via a light exit surface orthogonally to the longitudinal axis of the joint O. The emitted light LT in turn is received by a receiver E connected to the output joint OA. The receiver E is arranged such that a light-sensitive surface LEF is arranged as it were opposite the light exit surface LAF of the optical waveguide WL. As a result, the light has to traverse only a very short distance, and it is highly unlikely that an object of whatever kind will pass between the transmitter S and the receiver E. This light-based communication will therefore be very operationally reliable.

Figure 8:
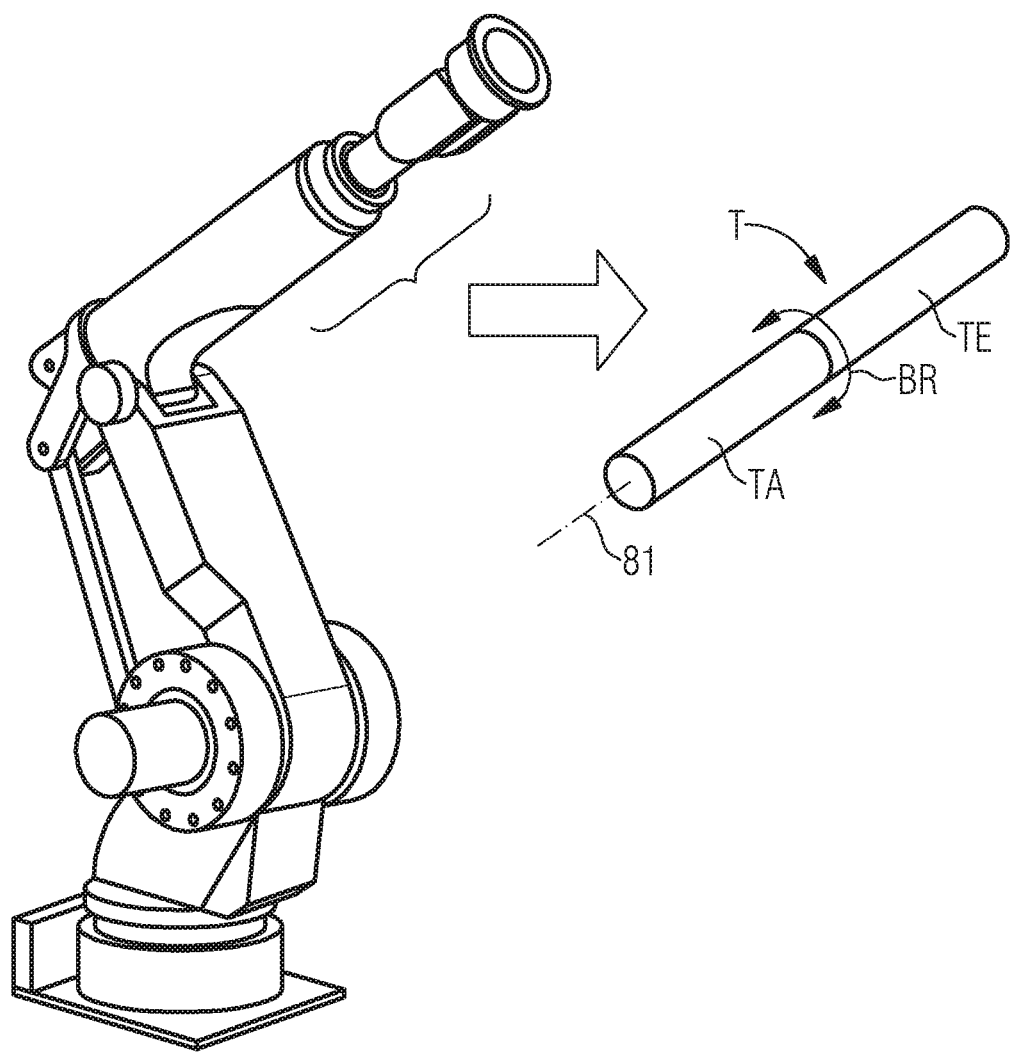
FIG. 8 shows the application of a twisting joint T.

FIG. 8 describes the application of a twisting joint T. As already described above, the twisting joint T is distinguished by a rotary motion that twists the two links of the joint relative to one another. In this case, the two links of the joint are arranged in an axis. The input link TE of the twisting joint T thus has the same axis of rotation as the output link TA of the twisting joint T. On the left-hand side of FIG. 8, by way of example, an industrial robot is illustrated together with the location at which such a twisting joint is used in said industrial robot. It is readily evident that the twisting joint T constitutes the last joint in the kinematic chain of the industrial robot, and the output link of the joint T is connected to the effector. The remaining joints of the robot illustrated are disregarded here since only the twisting joint T is intended to be discussed here.

Figure 9:
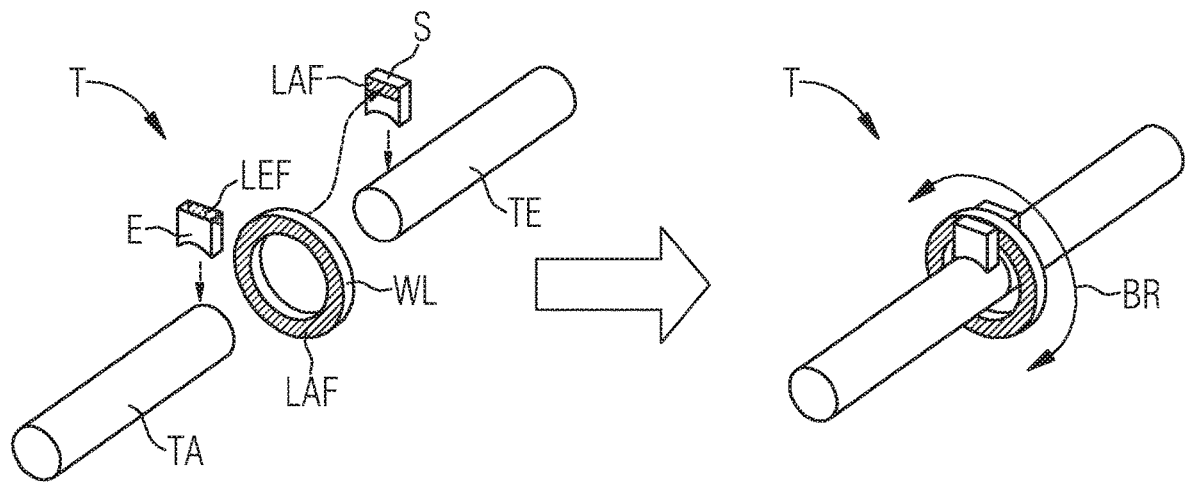
FIG. 9 shows a twisting joint T suitable for transmission by means of light-based communication.

FIG. 9 illustrates a twisting joint T suitable for transmission by means of light-based communication. As described above, the twisting joint T includes an input link TE and an output link TA. A transmitter S having a light output coupling surface LAF is fitted to the input link TE. A ring-shaped optical waveguide having a light input coupling surface LEF and a light output coupling surface LAF is fitted at the abutment between the input link TE and the output link TA. The light input coupling surface LEF and the light output coupling surface LAF are arranged on the opposite sides of the ring. A receiver E is arranged on the output link TA, said receiver in turn including a light input coupling surface LEF. The light then passes via the light output coupling surface LAF of the transmitter S to the light input coupling surface of the optical waveguide WL. The latter distributes the light over the entire ring, which light is then emitted by the light output coupling surface LAF of the optical waveguide WL. Part of the emitted light then in turn passes to the light input coupling surface LEF of the receiver E and is received and also processed further there. Thus, the signal is then at the output link TA. The twisting joint in FIG. 9 is illustrated as an exploded drawing. The twisting joint T is illustrated as a joined-together joint at the bottom right of the figure. The rotary motion BR of the twisting joint T is also depicted here. Here, too, it can be established very easily that the light has to traverse only very short distances from the transmitter to the receiver, and it is highly unlikely that disturbing objects will be able to pass into the region of the light and initiate disturbances. Thus, the twisting joint T is also very operationally reliable, and not very susceptible to interference. In this case, the optical waveguide WL is configured in such a way that the light emitted by its light output coupling surface LAF can be received at any time and directly by the light input coupling surface LEF of the receiver E. Since the twisting joint T permits an angle of rotation of 360°, the optical waveguide WL is thus configured in ring-shaped fashion.

Figure 10:
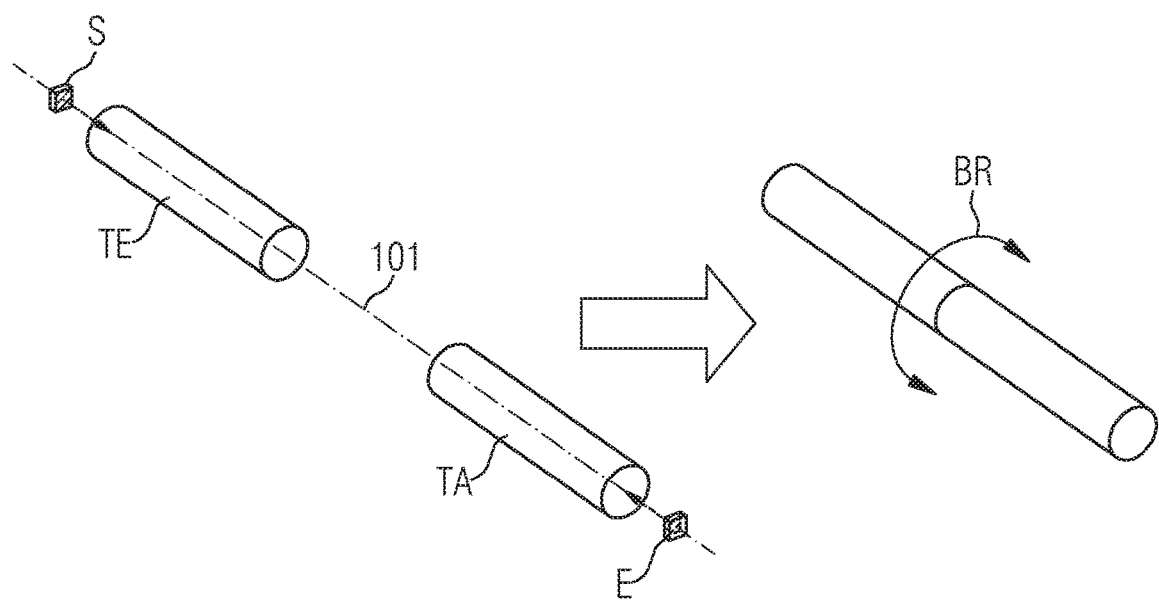
FIG. 10 shows a further, mechanically simpler embodiment of the twisting joint T.

A further embodiment of the twisting joint T is illustrated in FIG. 10. This embodiment is significantly simpler mechanically, since it manages without light guides. For this purpose, the input link TE and the output link TA are each embodied as tubular, that is to say hollow. The axis 101 of rotation of the joint is likewise depicted here. A transmitter S is arranged at that end of the input link TE which faces away from the twisting joint. The joint mechanism must then be embodied such that it is likewise hollow on the inside. As a result, the light emitted by the transmitter S can pass through the input link TE, the joint mechanism, and the output link TA to the receiver E. Since the light is guided as it were within the robot or the joint in this embodiment, the latter is particularly operationally reliable since no parts can pass into the optical light path. The joint in the assembled state is illustrated on the right-hand side of FIG. 10. The direction BR of motion of the joint is also depicted here.

Figure 11:
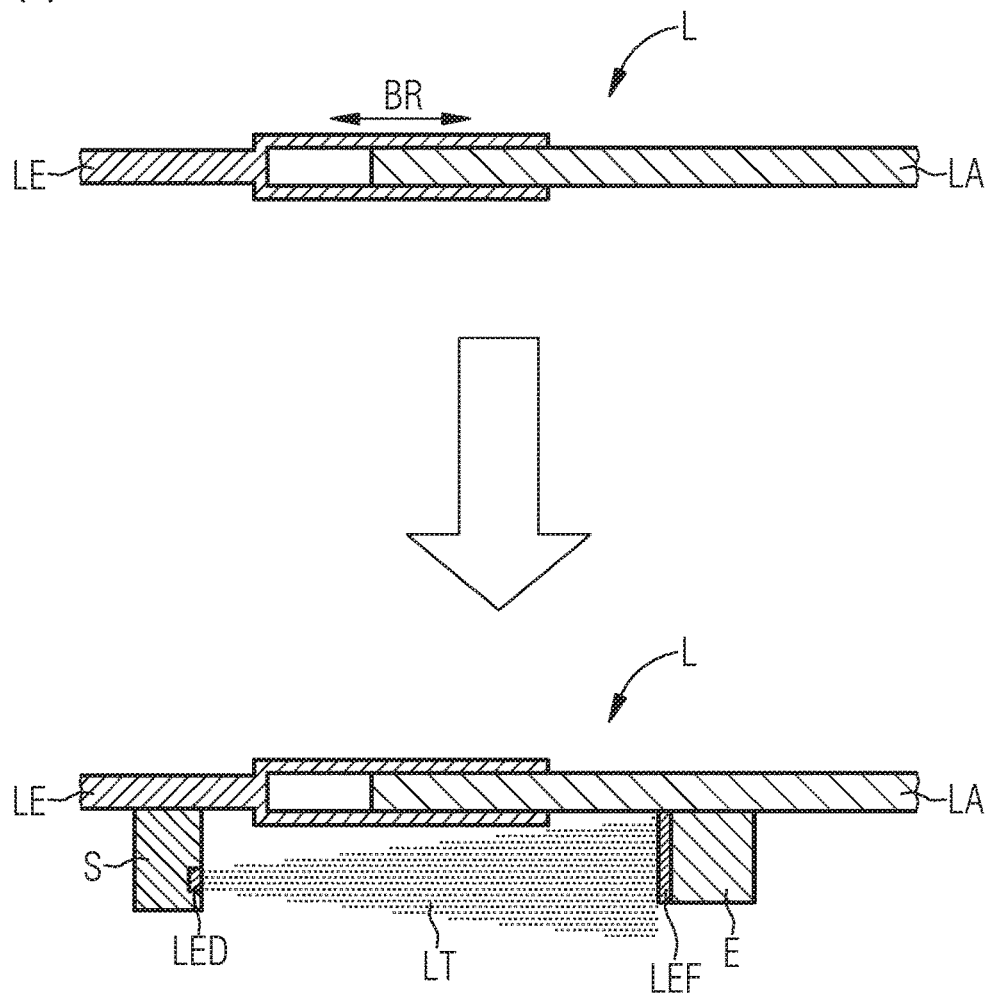
FIG. 11 shows a schematic illustration of a linear joint L.

FIG. 11 schematically shows a linear joint L. The linear joint L also includes an input link LE and an output link LA. A linear link L equipped for light-based communication is illustrated on the right-hand side of FIG. 11. For this purpose, once again a transmitter is connected to the input link LE. A receiver E is once again connected to the output link LA. The transmitter S includes an optoelectronic element LED. The optoelectronic element LED can be a light-emitting diode, a laser diode, an organic light-emitting diode or the like. The optoelectronic element LED radiates light at a specific solid angle. Part of the light LT radiated by the optoelectronic element LED is received by a light input coupling surface LEF. The light input coupling surface LEF is part of the receiver E. The light LT received by the light input coupling surface LEF is converted back into an electrical signal and processed further by the receiver E. Here, too, data pass from the input link LE to the output link LA in a very simple manner. The disadvantage of this solution is readily apparent in FIG. 11 since the light LT has to traverse a relatively long distance to pass from the optoelectronic element LED as far as the light input coupling surface LEF. As a result, objects can relatively easily penetrate into the light path and cause disturbances.

In order to address this problem, a further embodiment of the linear joint L including an optical waveguide is proposed.

Figure 12:
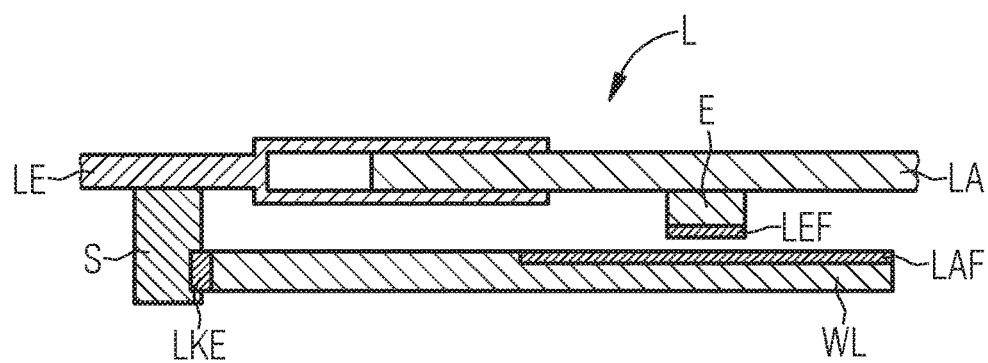
FIG. 12 shows a schematic illustration of said linear joint L permitting optical communication across the joint.

FIG. 12 shows a schematic illustration of this linear joint L, which permits optical communication across the joint which is more immune to interference. This linear joint L, too, again includes an input link LE and an output link LA. The input link LE once again has a transmitter S connected to the input link LE. Here, too, the transmitter S includes an optoelectronic element LED, which is not illustrated in the figure. The light radiated by this optoelectronic element LED is fed via a light coupling element LKE to an optical waveguide WL. The optical waveguide WL relays this light over the entire extent of the optical waveguide, and emits the light on the entire light output coupling surface LAF, which is part of the optical waveguide. The light output coupling surface LAF is arranged such that the light radiated by it can be received by a light input coupling surface LEF of the receiver E in any position of the linear joint L. The receiver E is part of the output link LA, and is connected thereto. This measure minimizes the distance that has to be traversed by the light from the light output coupling surface LAF of the optical waveguide as far as the light input coupling surface LEF of the optical receiver E. This embodiment is thus more immune to interference vis-à-vis foreign bodies in the air than the preceding embodiment.

Figure 13:
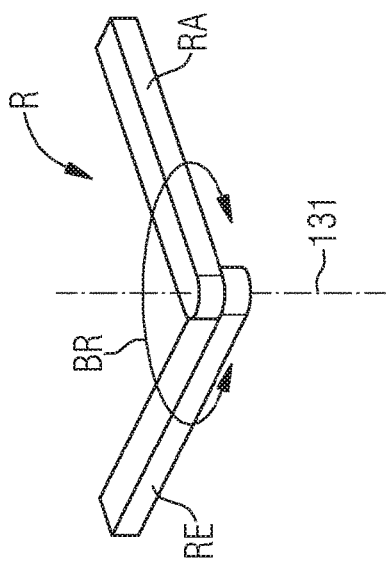
FIG. 13 shows a schematic illustration of a rotational joint R.

FIG. 13 shows a schematic illustration of a rotational joint R. The rotational joint also includes an input link RE and an output link RA. The axis 131 of motion of the rotational joint is orthogonal to each of the links RE and RA thereof. The direction of motion of the joint is thus circular about the axis 131 of rotation; in this case, the links rotate circularly about the orthogonally arranged axis 131 of rotation situated at their end. Rotational joints are one of the most common joint connections in industrial robot construction. These joints are distinguished by the fact that they can overcome greater distances since the axis 131 of rotation is orthogonal to the axis of the two links. On account of these properties, however, the bending stress is also the greatest here in the case of conventional lines. This is also evident in that the configuration of light-based communication is best realized with the aid of an optical waveguide.

Figure 14:
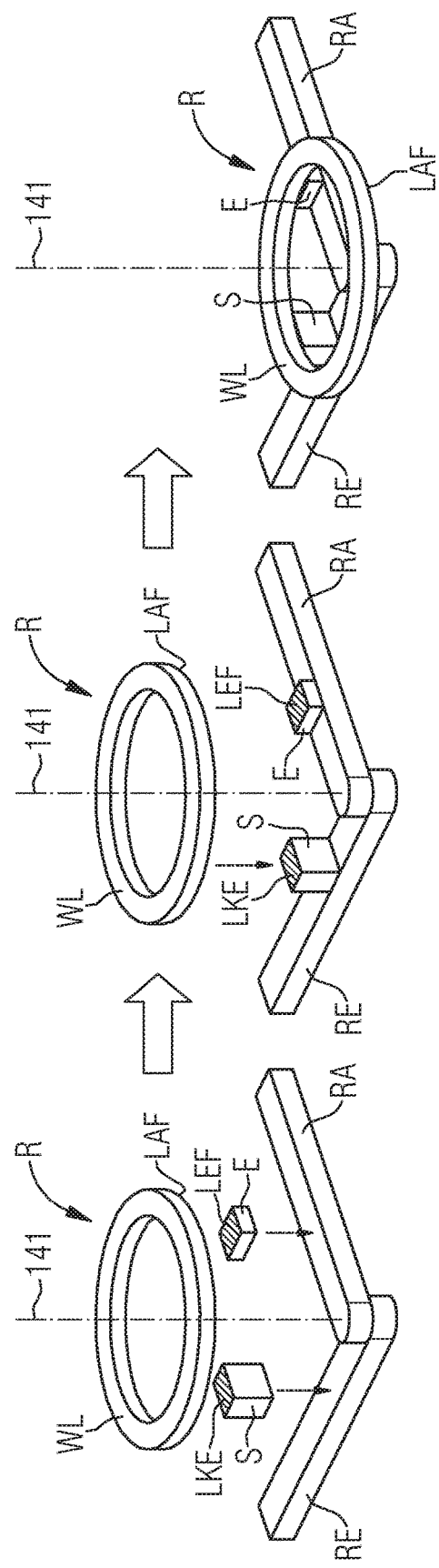
FIG. 14 shows a schematic illustration of one embodiment of a rotational joint R equipped for light-based communication.

FIG. 14 shows a schematic illustration of one embodiment of a rotational joint R equipped for light-based communication. The rotational joint R is illustrated three times in FIG. 14. One time in an exploded illustration, one time in a semi-assembled state, and finally the third time in its assembled state. The three illustrations serve to better illustrate the construction of the joint. The present embodiment is realized with the aid of an optical waveguide WL. As in the previous solutions, the input link RE is connected to a transmitter S. The transmitter S once again includes an optoelectronic element LED (not shown), which radiates light of a specific wavelength, which is collected in a light coupling element LKE and is emitted to an optical waveguide WL. The optical waveguide WL has a light output coupling surface LAF at its lower surface. Said light output coupling surface LAF lies in a plane which is a parallel plane with respect to a light input coupling surface LEF of a receiver E. The receiver E is once again connected to the output link RA. The light output coupling surface LAF and the light input coupling surface LEF are thus arranged opposite. There is only very little distance between the light output coupling surface LAF and the light input coupling surface LEF, which has the effect that it proves to be very difficult for foreign bodies to penetrate into this gap. As a result, the optical communication between the input link RE and the output link RA is very immune to interference. The light is thus radiated by way of the optoelectronic element LED, collected in the light coupling element LKE and emitted to the optical waveguide WL. The optical waveguide WL distributes the received light over the entire angle of rotation of the rotational joint R. That is to say that at any conceivable angle that can be adopted by the rotational joint L, light is radiated by the light output coupling surface LAF of the optical waveguide WL and is received by the light input coupling surface LEF. For this reason, the optical waveguide WL is also configured in ring-shape fashion. In this case, the light output coupling surface LAF is arranged at the underside of the ring-shaped optical waveguide WL. At the location at which the optical waveguide WL is connected to the transmitter S via the light coupling element LKE, the light output coupling surface LAF is emitted, and is configured as a light input coupling surface.

The following figures illustrate various applications which include the joints described above, and are therefore suitable for light-based communication.

Figure 15:
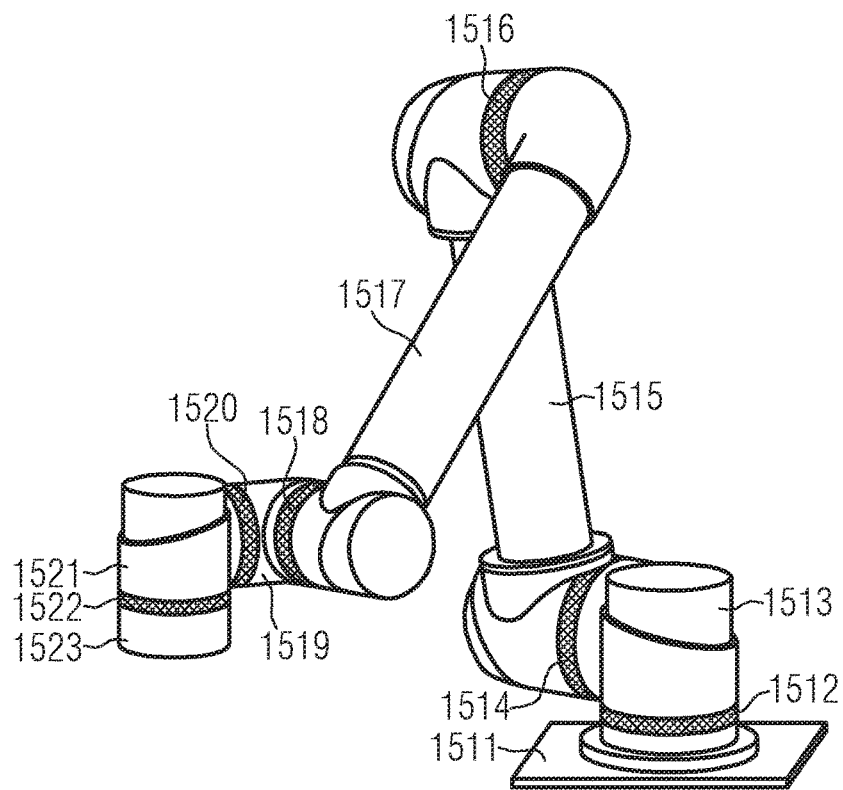
FIG. 15 shows one example of an arm of an industrial robot as an application of the joints with light-based communication.

FIG. 15 shows one example of an arm of an industrial robot. The arm includes a base 1511, which is fixedly mounted. Said base is connected to a first link 1513 via a first revolving joint 1512. The link 1513 is simultaneously an output link for the first revolving joint 1512 and an input link 1513 for a second revolving joint 1514. The output link 1515 thereof is in turn simultaneously an input link for a first rotational joint 1516. The rotational joint 1516 in turn includes as an output link a link 1517 which is simultaneously an input link for a third revolving joint 1518. Said third revolving joint 1518 in turn includes as an output link a link 1519 which is simultaneously an input link for a fourth revolving joint 1520. Said revolving joint 1520 has a link 1521 as an output link. The link 1521 is in turn an input link for a first twisting joint 1522, the output link of which is the effector 1523. The arrangement of joints illustrated here is not unusual for industrial robots. Since each link of the robot has to be supplied with information, in the case of the robot in accordance with the prior art it is necessary to lead a cable connection via each of the joints. For this robot this means six cable connections, which would be expensive to maintain. If the above-described joints with light-based communication are used for such an industrial robot, then this communication becomes maintenance-free at least within the robot. This constitutes a considerable facilitation for production since many of such robots find application in production, and the potential for saving with regard to maintenance is multiplied. In this case, the robot can be structurally designed such that all elements of the light-based communication are concealed behind a cover or in the interior, with the result that operational reliability is increased further since no foreign bodies can penetrate into the communication path. This is a considerable advance by comparison with the known solution since, in the case of the known solution, normally relatively long cables hang down between the joints, in which a wide variety of objects can get caught, and adversely affect operation of the robot.

Figure 16:
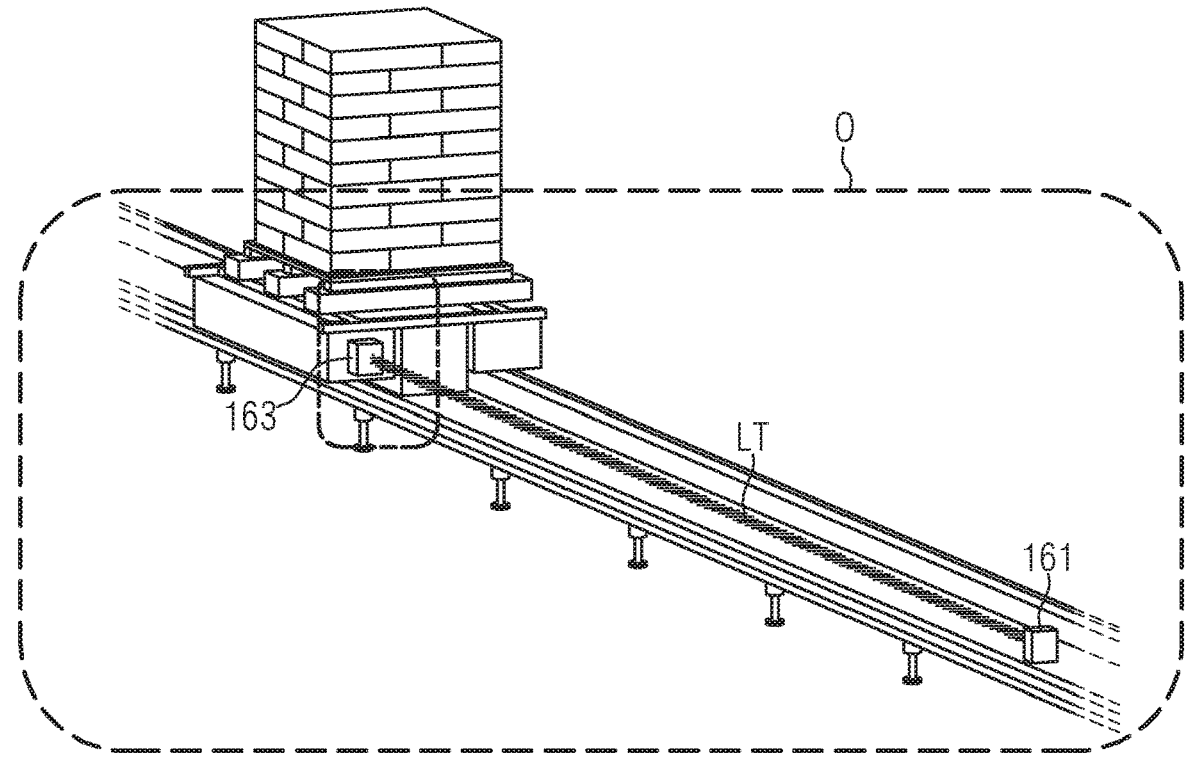
FIG. 16 shows a further application of light-based communication in a rail system within a production hall.

FIG. 16 describes a further application in a rail system within a production hall. A single orthogonal joint is used for communication along the rail system. For real duplex communication, in contrast to what was described above, there is not one transmitter and one receiver, rather each unit is simultaneously a transmitter and a receiver. This means that each unit simultaneously includes on each side an optoelectronic element LED for radiating the light required for communication and a light-sensitive element for receiving the light used for communication. In this case, these transceiver units can be embodied identically, thus resulting in further cost savings here. In this application, the input link is the rail system, and the output link is the carriage that travels along the rail. In this case, the transceiver system mounted on the rail emits the light provided with the information along the rail system. The transceiver system 163 mounted on the carriage in turn receives the light emitted by the other unit 161. The information required for communication is thus transmitted by way of a light beam LT. For paths which also have curves, an alternative variant is conceivable in which the light beam LT is replaced by a light guide running along the rail in the center. On its top side, said light guide includes a light output coupling surface LAF, which radiates the light upward over the entire length. This light radiated by the light output coupling surface LAF is received by the transceiver unit 163, by means of a light input coupling surface LEF situated opposite, and is processed further.

Figure 17:
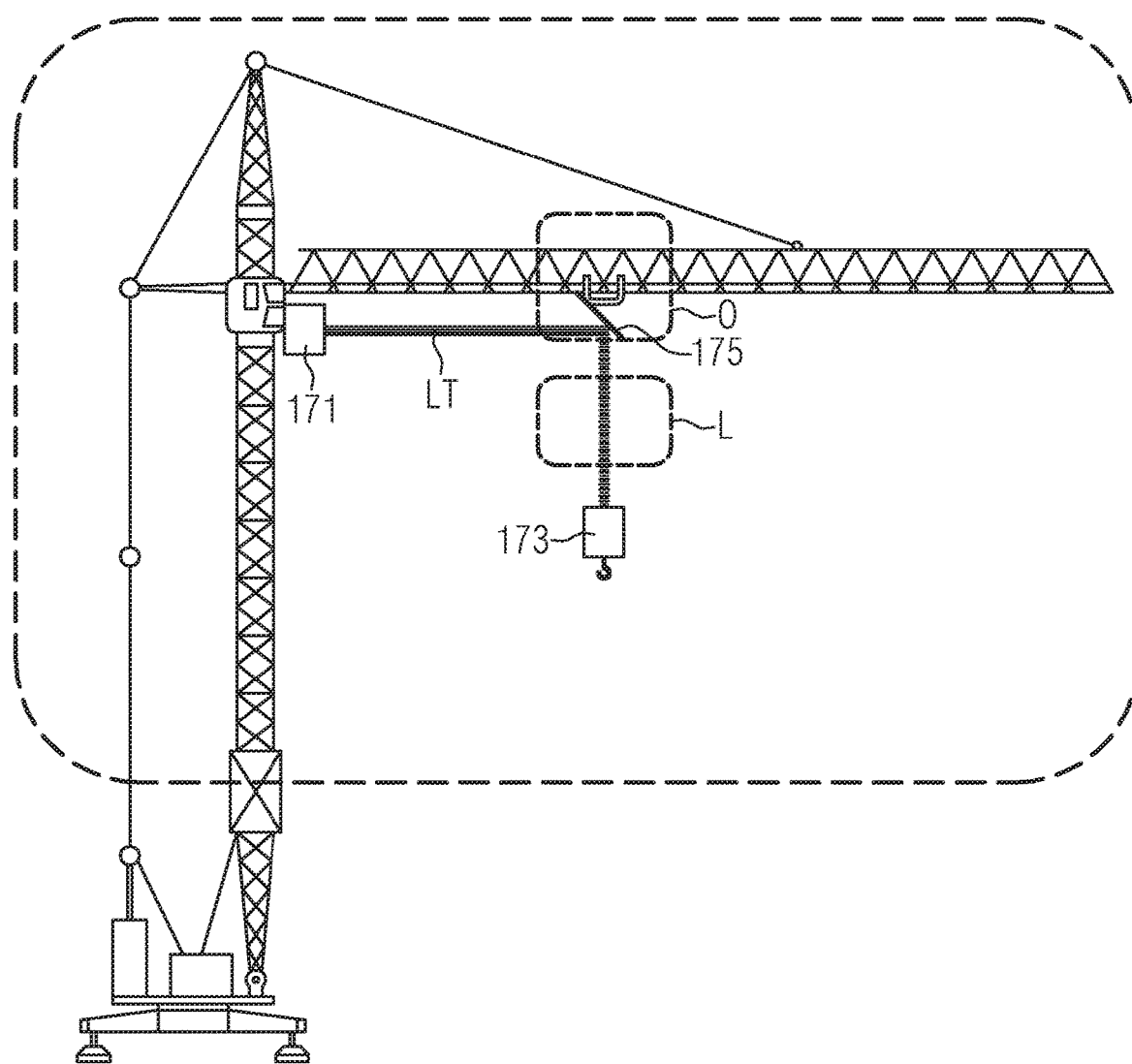
FIG. 17 shows a crane as a further application of a light-based communication system.

FIG. 17 describes a further application of a light-based communication system in the form of a crane. Here the communication connection serves e.g. to supply a motorized crane hook with information from the crane, or to transmit a camera image from the crane hook to the crane. Since the crane hook is attached to a strong steel cable, communication via an additional network line here is very difficult through to impossible. Therefore, for this application it is proposed to connect the crane and the crane hook to one another by way of a combination of a linear joint and an orthogonal joint. The interpretation of a linear joint should be interpreted very broadly here. Once again two transceiver units are used for the communication. A first transceiver unit 171 is attached to the crane. This transceiver unit 171 transmits a highly focused light beam in the direction of the crane jib. In this case, the transceiver unit 171 is attached to the jib. As a result, the light beam always emits its light in the axis of the crane jib. The carriage or slide from which the steel cable for the crane hook is suspended is provided with a mirror 175, which deflects the radiated light from the transceiver unit 171 downward in the direction of the crane hook. The crane hook in turn is equipped with a second transceiver unit 173, which receives the light deflected by the mirror 175 and processes it further. The entire communication chain can accordingly be regarded as a concatenation of two joints, namely a first orthogonal joint O and a first linear joint L. In this case, the orthogonal joint O is the carriage or slide to which the steel cable for the crane hook is secured, and which is movable along the jib. Since the crane hook can be raised and lowered, it can be designed as a linear joint. By way of this light-based communication, information can be transmitted from the crane to the crane hook and back very simply and precisely. This is because the transceiver unit 173 can also emit an intense light beam, which is deflected by the mirror 175 and impinges on a light input coupling surface of the transceiver unit 171. Bidirectional communication can thus be established. In this case, information can be exchanged between crane and crane hook. This can be not just information for a motorized crane hook; rather, the crane hook can also be equipped with a camera, for example, by way of which the crane driver can navigate very exactly. Since the light-based communication has a very high data rate given appropriate design, a high-resolution camera image can be transmitted without problems. A crane equipped with such a crane hook camera is a major advance for the crane driver, who otherwise normally sits very far away from the action. Since eyesight deteriorates precisely in the case of older persons, such a camera with a corresponding monitor can be a great facilitation and result in significantly more effective work by the crane driver.

Figure 18:
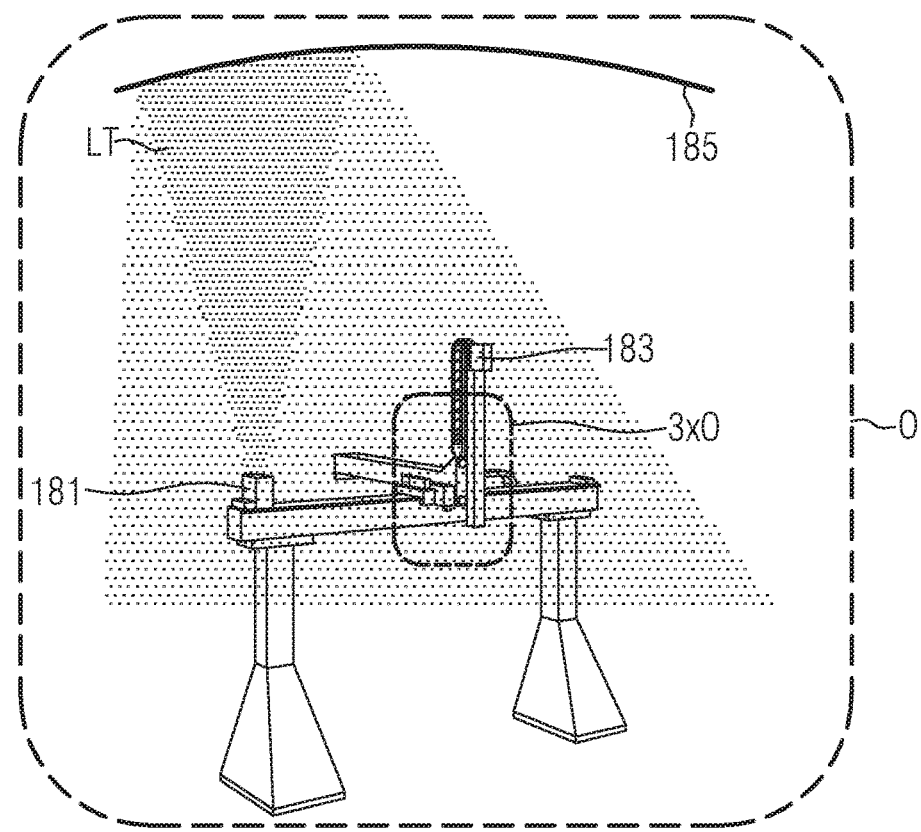
FIG. 18 shows a further application of a light-based communication system in the form of a gantry robot.

FIG. 18 shows a further application of a light-based communication system in the form of a gantry robot. In this case, the gantry robot is a typical gantry machine which permits movements in three axes. Here an orthogonal joint is used in each case for the X-axis, for the Y-axis, and for the Z-axis. Each axis here has a rail system in the corresponding spatial direction. A first transceiver unit 181 is connected to that rail system which is in turn connected to the base of the gantry robot. Said transceiver unit 181 radiates light LT upward in the direction of the ceiling of the room in which the gantry robot is located. A mirror or some other reflective element 185 is attached to the ceiling of the room and reflects the light LT radiated by the transceiver unit 181 back on the gantry robot. Here the light is received by a second transceiver unit 183, which is connected to the Z-axis rail of the gantry robot. The control information thus passes across all three orthogonal joints from the base of the robot to the Z-axis with the effector of the robot.

Figure 19:
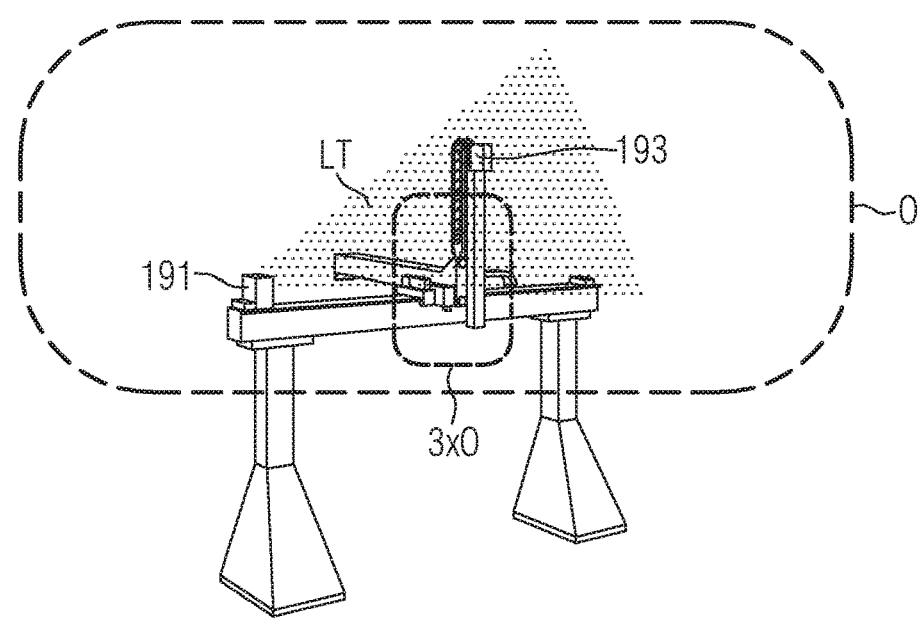
FIG. 19 shows a simpler configuration of a light-based communication system for the gantry robot from FIG. 18.

FIG. 19 shows a simpler configuration of a light-based communication system for the gantry robot from FIG. 18. Here the light LT passes from the transceiver unit 191 connected to the base, directly and without a mirror, to the transceiver unit 193 connected to the Z-axis. The gantry robot here is constructed identically to that in FIG. 18. Thus, once again three orthogonal joints are used, which are configured as rails pointing respectively in a spatial direction. In this case, the two transceiver units 191 and 193 are fitted in such a way that the light LT radiated by the transceiver unit 191 can directly be received by the transceiver unit 193 and processed further. Since the three orthogonal joints of the three axes in each spatial direction form a foreseeable system, the two transceiver units can be arranged in such a way that no shading or similar problems can occur. This configuration will thus function with similar reliability to that of the configuration with a mirror, but is significantly simpler since no other conditions of the room need be taken into account when installing the robot.

Communication with Light/Communication Between the Joints

On account of their similarities, light-based communication affords configuration possibilities similar to those afforded by radio communication. The data flow to be managed can be divided into a plurality of channels. In comparison with radio, in the case of light-based communication, different wavelengths of the light can be regarded in each case as a dedicated light-based channel. By way of example, red, green and blue light can be regarded as an example of different wavelengths in the light range. Furthermore, light not visible to human beings in the infrared range (near, medium or far infrared) and ultraviolet light can also be utilized for transmitting information. Furthermore, a plurality of wavelengths can be used simultaneously for the transmission (e.g. in order to introduce redundancy and thus to increase the reliability of the transmission) or it is possible to use the mixing of different wavelengths such as e.g. in the case of white light for transmitting information. By virtue of the fact that light has a significantly shorter wavelength than the radio channels usually used, potentially more information per unit time can be transmitted via a light-based channel, which cannot yet be fully exhausted from a technical standpoint at the present time, but offers enormous potential for future developments. Furthermore, the wavelength range from infrared through visible light to ultraviolet encompasses an extremely large spectral range that can be used for the transmission. Light as transmission medium thus offers enormous potential for high bit rate communication or opens up the possibility for a multiplicity of parallel transmission channels. The problem with light-based communication, however, is that light-based channels are generally subjected to severe interference. Light from other sources and daylight in the region of windows shall be mentioned here as a simple example. This light can directly or indirectly influence the transmission quality of the various light-based channels used. In order to combat this problem, it is necessary to configure and design the transmission system accordingly. This encompasses analog transmitting and receiving assemblies and further circuit components, the modulation method and the coding, the signal processing, channel access and transmission protocols, and also diverse protection mechanisms and configuration possibilities at higher protocol and application levels.

An important step for enabling robust data transmission via a light-based channel is the choice of suitable modulation and coding methods. In advanced light-based data transmission systems, a robust coding method together with a suitable modulation method is distributed among a plurality of light-based channels having a certain redundancy. This enables extremely robust and secure data transmission. Interference in specific wavelength ranges of the light is eliminated by the redundancy over different channels, viz. wavelength ranges. What is disadvantageous about this is that bandwidth is lost as a result of the redundancy and the coding, with the result that the transmission rate achievable in practice is significantly lower than the wavelength would give reason to assume. Since the theoretical value is very high, however, the rate achievable in practice is nevertheless more than sufficient.

As is also customary e.g. in the case of radio and in the case of wired transmission methods, bidirectional transmission can be realized by (half-) duplex transmission in time and frequency division multiplex methods. In the case of light-based communication, it is additionally appropriate here to use different wavelengths (with non-overlapping spectra) for the duplex transmission. In this case, outgoing and return channels are then in different wavelength ranges, such that outgoing and return channels can be transmitted simultaneously. Genuine full-duplex transmission would also be conceivable in principle, but is primarily of academic interest on account of challenges in the realization.

As is also already customary in the case of other data transmission methods, the bandwidth for the outgoing channel and for the return channel can turn out to be different. Such asymmetric transmission methods are customary for example in the case of data transmission by means of DSL. In many applications, for example also when driving robots, more data will need to be transmitted for the outgoing channel than for the return channel. Therefore, it can make sense for example to use a plurality of channels for the outgoing channel, and only one or fewer channels for the return channel. This can vary greatly depending on the application. In principle, it is also possible, of course, to use light-based data communication only for the outgoing channel, and to resort to some other data transmission for the return channel. This can be for example radio-based data transmission in accordance with one of the established standards. In principle, light-based data communication is highly scalable by virtue of the very high bandwidth. Very many different possibilities enabling optimum utilization of the bandwidth present may be possible.

Light sources that rapidly follow the current are primarily taken into consideration as illuminants for the light-based data communication. In this case, the light sources are intended to have the highest possible modulation bandwidth. The light-emitting diode, the laser diode, the surface emitter (Vertical Cavity Surface Emitting Laser/VCSEL), or the MicroLED shall be mentioned here by way of example. These can operate in the infrared range, in the visible or in the ultraviolet wavelength range, depending on the constitution and the semiconductor materials used. Since modern luminaires are equipped with light-emitting diodes anyway, in the best case no additional outlay is necessary in order to be able to use the light-based data communication. Even if the illuminants used for the luminaire appear to be unsuitable, for example one or more light-emitting diodes which radiate in the infrared range and which can be used for communication can be integrated into the luminaire with little outlay.

In the case of a rectangular office luminaire, for example, the light-emitting diodes used for the light can be arranged in a ring-shaped matrix, wherein some of the central light-emitting diodes in the center of the matrix are omitted and light-emitting diodes that radiate in the infrared range are used here instead of the light-emitting diodes used for the light. This can be done in a similar manner in the case of a round ceiling luminaire; the light-emitting diodes generating the light can be arranged in circular fashion, wherein the light-emitting diodes used for the data communication are arranged in the center of the luminaire. Of course, the light-emitting diodes used for the data communication can however also be arranged elsewhere in the respective matrix. With regard to the printed circuit board layout, however, it will be advantageous if the light-emitting diodes used for the data communication will all be grouped at one location.

If the luminaire is embodied as a game grid luminaire, then the data communication could be adversely affected by the mirror systems. It can be expedient here to arrange the light-emitting diodes used for the data communication outside the mirror grid. The light-emitting diodes used for the data communication can be arranged at the corners of the luminaire, for example. However, it would also be possible to arrange these light-emitting diodes in the mirror grid in such a way that the light emission is no longer impaired by the mirror grid itself.

A direct line of sight (LoS) between transmitter and receiver is generally advantageous in the case of light-based communication since reflected signal components are often greatly damped and/or have a temporal offset with respect to one another, which in turn hampers signal reconstruction. The data transmission quality is therefore generally better given a LoS. Depending on the configuration of the spaces to be provided, however, "blind spots" can occur in the coverage with light-based communication. Said blind spots are locations at which direct data communication cannot take place. These may be, for example, shading behind columns or the like. In order to maintain the data connection in these cases, indirect signal components, i.e. reflections, have to be used for the communication. In this case, it is important for the communication system to be configured in such a way as to make this possible. For example by means of a suitable choice of hardware components, modulation and coding methods. If such a transmission system is available, reflective surfaces can generally be employed for operation. In the simplest case, reflective surfaces can be walls painted white, or alternatively special mirrors that reflect the communication light onto the corresponding blind spots, with the result that communication can be effected there as well.

A luminaire can furthermore be designed to set up various communication channels. In this case, one communication channel can serve for forming a mesh network, whereas another communication channel is used for communication with the clients such as e.g. smartphones or other terminals. In order to form a mesh network, communication between different luminaires is striven for. In this case, the luminaires form the nodes of the mesh network. One advantageous configuration of a luminaire which is network-enabled includes one or more light-emitting diodes arranged in a vertical light-emitting direction in order to ensure the communication with the terminals. Furthermore, one or more light-emitting diodes is/are arranged in a horizontal direction on the luminaire and realize(s) the communication between the luminaires. An arrangement in different horizontal directions is particularly advantageous here in order that a luminaire can communicate with each luminaire surrounding it. By way of example, a light-emitting diode can be arranged in a horizontal emitting direction at each corner of the luminaire. In the case of round luminaires, by way of example, four light-emitting diodes can be arranged in a horizontally emitting direction, said light-emitting diodes being arranged offset by 90° in each case.

For the communication between the luminaires, it is possible to use a specific protocol which is able independently to establish a mesh network. For this purpose, it is necessary for the protocol to include specific commands for forming meshes. In order to link this mesh network to the Internet, a gateway is necessary. This gateway can advantageously be arranged in one of the luminaires. Ideally, the gateway is arranged in that luminaire which is installed not far from a wire-based network access point. The gateway can be for example a standard gateway in accordance with IEEE 802.3. However, many other variants, for example optical-fiber-based variants, are also conceivable.

As already mentioned above, light-based communication is primarily suitable for robots used in a difficult environment of industrial manufacturing. By way of example, welding robots are particularly worthy of mention here. Welding robots operate with high currents; strong electromagnetic fields arise during welding work and make a radio connection virtually impossible. Communication via flexible cables is also difficult in the case of these robots since hot particles are emitted by the welding location during welding and can damage the lines between the robot joints. For this reason, light-based communication is particularly suitable. By means of suitable measures on the joints, it is possible to minimize interference resulting from the bright light emission during the welding process. Since there is no need to use flexible parts here, all components that participate in the communication can be protected securely and with long life using metallic sheets, for example.

However, not just welding robots but also many other types of robots which have to operate in difficult environments benefit here from the secure light-based communication. Since light-based communication across robot joints, given correct implementation, is not more expensive than communication via flexible lines, it can however also be employed in all other types of robots, which do not necessarily have to operate in difficult environments. Light-based communication is thus universally usable for many conceivable types of robots.

It is thus particularly suitable for example for care robots as well. Firstly, care robots must have great operational reliability since they usually handle human beings who often cannot either defend themselves or express themselves. Since care robots very often have to care for old human beings, an exterior that should give a pleasant impression is likewise very important. Line-based communication across the robot joints usually results in a highly mechanized and repellant appearance. This reduces the acceptance of such machines for use in the care of human beings. Light-based communication can contribute to enabling the robots to adopt an appealing exterior, and the acceptance of such machines in the care sector can thus be increased.

Particularly in the care sector, the use of humanoid robots is expedient since this can greatly increase the acceptance of such robots. Humanoid robots usually include joints similar to those that also occur in human beings. In terms of their degrees of freedom, these joints are often far more complex than the joints used in industrial robots. Light-based communication can make a significant contribution here since the data transmission can be made far more flexible than is possible with line-based communication. Light-based communication can advantageously be used precisely in the case of joints having many degrees of freedom, such as the hip joint or the elbow joint, for example.

In the case of light-based communication, however, not only the communication between two joint parts but also the communication between a control center and the robot itself should be taken into account. Precisely in the care sector, light-based communication can advantageously be used here. Precisely in the care sector, radio-based wireless communication is not desired since it can interfere with the sensitive medical instruments. Therefore, telephony using cellular phones is also prohibited in many hospitals. For this reason, it is likewise undesirable for care robots to communicate with the control center via wireless communication. Light-based communication is greatly advantageous here. Since at least one luminaire is present in every room, it can be used not only to emit light but also to communicate with the care robot or other technical devices. By way of this communication, semiautonomous care robots can receive new information about tasks to be processed, and a central controller knows at all times which robot is situated in which room. In the case of emergencies, by way of this communication, the robot can very quickly pass important information to the control center, such that the latter can then implement suitable measures. Thus, precisely in the care sector, light-based communication can play a central part in the patients' welfare.

However, light-based communication can advantageously be used for example in the case of exoskeletons as well. Exoskeletons are increasingly gaining in importance since they can support and also protect human beings during labor- and strength-intensive work. Exoskeletons can advantageously be used particularly for work requiring the lifting of heavy loads. Exoskeletons having hydraulic joints are often used for this work since a great deal of force can be transmitted by means of a hydraulic mechanism. Therefore, such skeletons then often do not have any electrical lines that are routed via the corresponding joints of the exoskeleton. Wired communication across the joints is thus difficult and associated with increased outlay. Therefore, light-based communication can advantageously be used here, too. The abovementioned advantages of the simple and robust components at the joints are applicable in particular here, too. In the case of exoskeletons that do not provide any current-carrying lines across the joints, light-based communication can be used, in particular, in which the light transmits not only the data but also the energy required for reception and further processing.

One special case of the application of light-based communication for robots is the application for robots having a hydraulic drive. In the case of robots having a hydraulic drive, no suitable voltage is available to supply the transceiver units of the light-based communication with energy. In order that the light-based communication does not become unnecessarily expensive, it is proposed to position small generators at a suitable location in the hydraulic path of the robot, which generators generate electricity for supplying the light-based communication from the oil flow of the hydraulic mechanism.

Light Guides

The light guides used can generally be configured such that they realize gradual output coupling of the light coupled in. This can be used e.g. also to obtain information about the position of the joint by way of the illuminance. For example, a twisting joint may include a light guide having gradual output coupling by way of the possible rotation of the joint. It is thus possible to produce an indication of the rotary position of the joint by way of the intensity of the light coupled out. This can be used in the case of joints having rotary motion and also in the case of joints having translational motion.

However, the gradual output coupling can also be configured such that the light coupled out always has the same intensity over the coupled-out path distance. This can be an advantage in the case of translational and rotary joints since the received signal always has approximately the same signal strength. To that end, light guides had to be configured in such a way that less light is coupled out in the vicinity of the supplying light source, and more light is coupled out gradually with greater distance from the light source. In the case of ring-shaped output coupling surfaces having only one supplying light source at one location of the ring, that has the effect that the output coupling intensifies over an angle of approximately 180° and attenuates again since the light source comes closer again at larger angles.

In the case of larger linear systems, such as a rail system configured as a translational joint, for example, it can happen that it does not suffice to employ only one light source for supply and to couple the supplied light out again via one light guide. If the light guide becomes too long, the signal strength at the end of the light guide is too low. One solution to this problem consists in dividing the light guide into a plurality of segments, wherein a light-sensitive element with an amplifier is arranged at the end of a segment, and the amplified signal is fed into a new segment of the light guide via a light source. The light guide thus consists of a plurality of segments which are arranged independently of one another and between which a respective light amplifier is arranged. As already described above, the light amplifier consists of a receiver E including a light-sensitive element such as, for example, a photodiode or a light-sensitive resistor, and a transmitter S including a light source such as an LED or a laser diode, for example.

Precisely in the case of long-lived items, such as industrial robots, for example, it may become necessary to take account of the ageing of the light guides. Light guides are usually produced from plastics, which are subject to an ageing effect. The transmission behavior of the material changes in the process. The material deters, and the transmission for light thus decreases. In other words, the older such industrial items become, the poorer the light guiding capability of the light guide becomes. In the case of particularly long-lived items such as industrial robots, for example, it may therefore be expedient to take account of and compensate for this effect. That can be done by way of the transmitting module, for example, wherein in a new device the transmitting module does not radiate the full light power, but rather only a reduced light power. The transmitting unit or the robot includes an hour meter, the value of which is taken into account for the radiated light power of the transmitter. In this case, all the more light is radiated, the greater the value of the hour meter. In other words, the more operating hours the industrial robot has, for example, the higher the radiated power of the transmitter. In this case, the increase in the radiated power is dimensioned such that the ageing effect of the light guide material is compensated for. Thus, the receiver of such a communication unit substantially always receives a signal of the same magnitude. It goes without saying that the material is chosen such that it exhibits as few ageing phenomena as possible. The customary high-quality light guide materials used consist of acrylic (PMMA), for example, which has a high light transmission capability, and exhibits few ageing phenomena in the process. By means of the hour meter, planned maintenance ("predictive maintenance") can be realized, in the course of which aged parts are exchanged, and the robot will thus have a very high service life.

In the case of bidirectional connections, the transmitting and/or the receiving unit can be configured such that it can likewise receive and/or transmit, respectively. Each light-emitting diode can for example also be operated inversely and function as a photodiode. If the transmitter is intended also simultaneously to be a receiver, then the light source or the optoelectronic element should be chosen such that it can simultaneously emit light and can also receive light and convert it back into an electrical signal. It is clear that dual utilization of such an optoelectronic element is not very efficient. Therefore, separate elements for transmitter and receiver should be provided in the case of bidirectional connections. In order to be able to produce a bidirectional connection via a joint, a transmitter and also a receiver should thus be provided on each side of the joint. In this case, the transmitter and the receiver on each side of the joint can be linked to the same light guide.

For an optimum efficiency, the surface of the light input coupling surface LKE and/or of the light output coupling surface LKA is specially treated in order that as much light radiated by the optoelectronic element as possible is transmitted into the light guide. The same applies to the light coupling element if it is used for a joint. In this case, the surface is specially coordinated with the optoelectronic element. If the optoelectronic element is a receiver, such as a photodiode, for example, then the surface can have a different treatment than if the optoelectronic element is a transmitter such as an LED or a laser diode, for example. For this purpose, the surface can be specially structured, for example. Simple roughening can be regarded as the simplest structuring. However, more complex structurings with specific geometric patterns are also conceivable, which already deflect the light in a specific direction as it is coupled into the light guide. Instead of or in addition to the structuring, the surface can also be provided with an optically effective coating. These optically effective coatings are known from lens elements in the case of high-quality lenses/objectives or from spectacle lenses. In this case, the coatings can be multilayered and be embodied as interference coatings. However, it is also conceivable for the coating to consist of specific particles, such as photonic crystals, for example. Of course, a suitable combination of the possibilities mentioned above can also be provided in order to ensure that light is efficiently coupled into the light guide.

If the light-based communication is used for example in an area of a gateway or an access point to a terminal such as an industrial robot, then it is advantageous if the light for illuminating the area and the light used for the light-based communication have different wavelengths. By way of example, the light of the light-based communication can have a wavelength in the infrared range, whereas the area illumination includes a mixture of wavelengths that is perceived as white light. This ensures that the light-based communication is disturbed by the area illumination to a lesser extent. In this case, it is advantageous if the receiver is specially coordinated with the wavelengths of the range used, such that light having other wavelengths is ignored.

Light Communication in a Distribution Box

One special case of the light-based communication is communication in a switchgear cabinet or distribution box. Light-based communication is particularly advantageous here since high currents flow and strong electromagnetic interference fields exist in a switchgear cabinet. In a non-limiting embodiment, light-based communication is used here to establish a network connection. The protocol used is ideally an internationally standardized protocol for network connections. This can be for example a protocol in accordance with the IEEE 802.3 standard. Since internationally there is not yet a light-based communication standard, it can be advantageous if the terminals emulate the Ethernet standard in accordance with IEEE 802.3. Thus, many devices are connectable very simply by Ethernet cables, and the secure transmission of the light-based communication is usable very simply and conveniently.

In the case, too, of the use of light-based communication in a switchgear cabinet or distribution box, the question arises as to whether separate transceiver units are used for the outgoing channel and for the return channel. As already described above, for reliable and fast communication, each channel should have a dedicated transceiver unit. However, it is also possible for cost reasons, of course, to use only one optical waveguide and to provide the transmitting and respectively receiving unit spatially very closely adjacent to one another, such that a single light coupling surface can be used. Depending on that said light coupling surface serves as light input coupling surface or else indeed as light output coupling surface.

Figure 21:
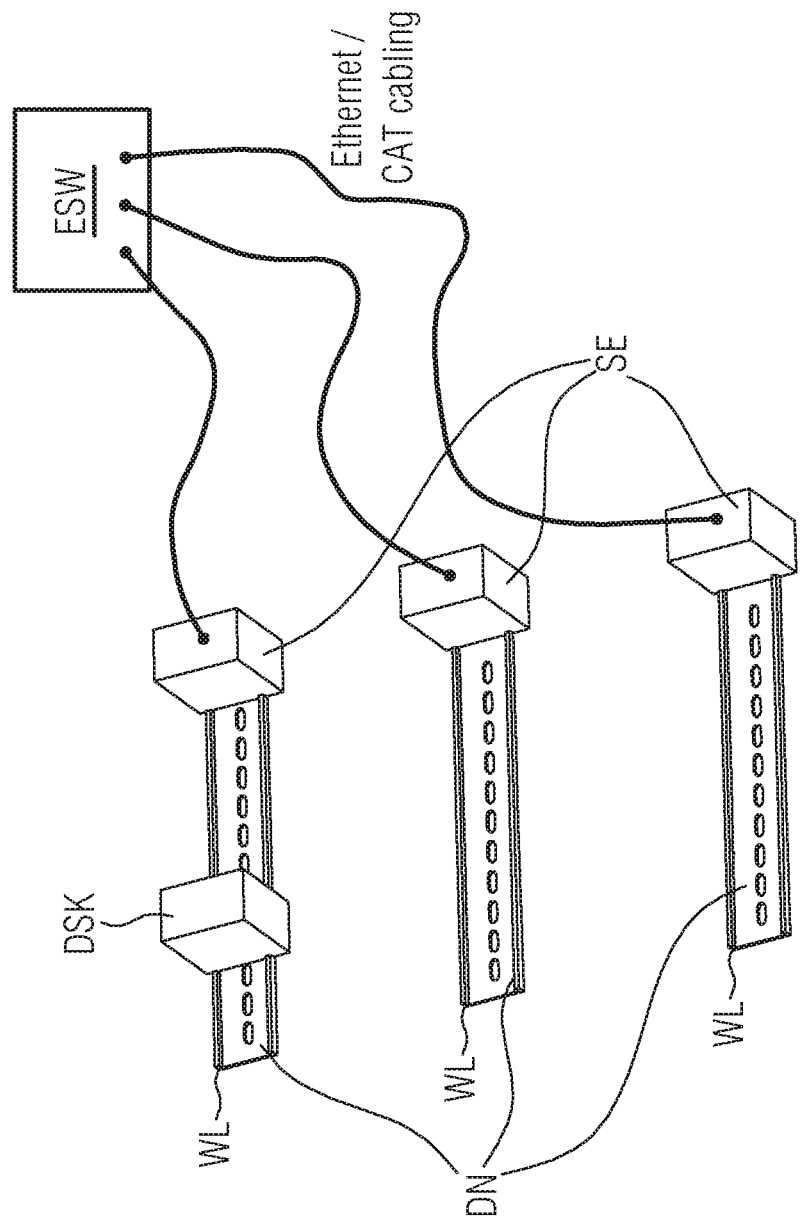
FIG. 21 shows a first embodiment of a light-based communication system for a DIN rail.

FIG. 21 shows a first embodiment of such a light-based communication system for a distribution box. The light-based communication system is constructed on the DIN rail, which affords many advantages: the DIN rail is a tried and tested and mechanically stable system. In the case of light-based communication, the data transmission is carried out contactlessly. In the case of the proposed solution, all components can be connected to the network simply and securely. The solution does not generate further electromagnetic interference, nor is it sensitive to such interference influences.

In the first embodiment in FIG. 21, each DIN rail is provided with a transceiver unit SE, these establishing light-based communication via an optical waveguide WL. The transceiver units SE in turn are connected to an Ethernet switch ESW or the like.

A DIN rail component DSK such as e.g. an automatic circuit-breaker or a contactor is equipped with a transceiver unit SE and can thus receive data from the optical waveguide WL and transmit data to the optical waveguide WL. In this case, the optical waveguide WL is configured such that it radiates the light of the transceiver unit SE of the DIN rail in the direction of the DIN rail component DSK. Since the DIN rail component is positionable freely on the rail, in principle, the arrangement can also be regarded as a linear joint.

Here, too, as already described above, the light coupling surface of the optical waveguide WL can be structured, can be provided with a coating, or a structuring and a coating can be provided in particularly complex cases. If the light guide is arranged along the DIN rail, then it can be advantageous if the light guide has light coupling surfaces at regular intervals. The intervals are ideally dimensioned such that they are of just the same magnitude as the internationally standardized pitches for devices on the DIN rail. It is thus possible to use smart automatic circuit-breakers, for example, which transmit their state, a measured current, or other parameters about the light-based communication, for the light guide along the DIN rail, to a central control device likewise arranged on the DIN rail. Since the automatic circuit-breakers are normally among the narrowest devices on a DIN rail, the pitch along the light guide is ideally coordinated with the width of the automatic circuit-breakers. If wider devices such as, for example, residual current circuit-breakers or the like are used, then these their transceiver units can always be arranged at a location corresponding to the grid. In this case, it is unimportant if not every light coupling surface is used by a transceiver unit. Although the light coupled out by a light coupling surface is lost, the light intensity coupled in by a device can be dimensioned such that they are designed for the customary widths of switchgear cabinets and can supply all light coupling surfaces along this width, without the signal strength decreasing to an excessively great extent.

Figure 22:
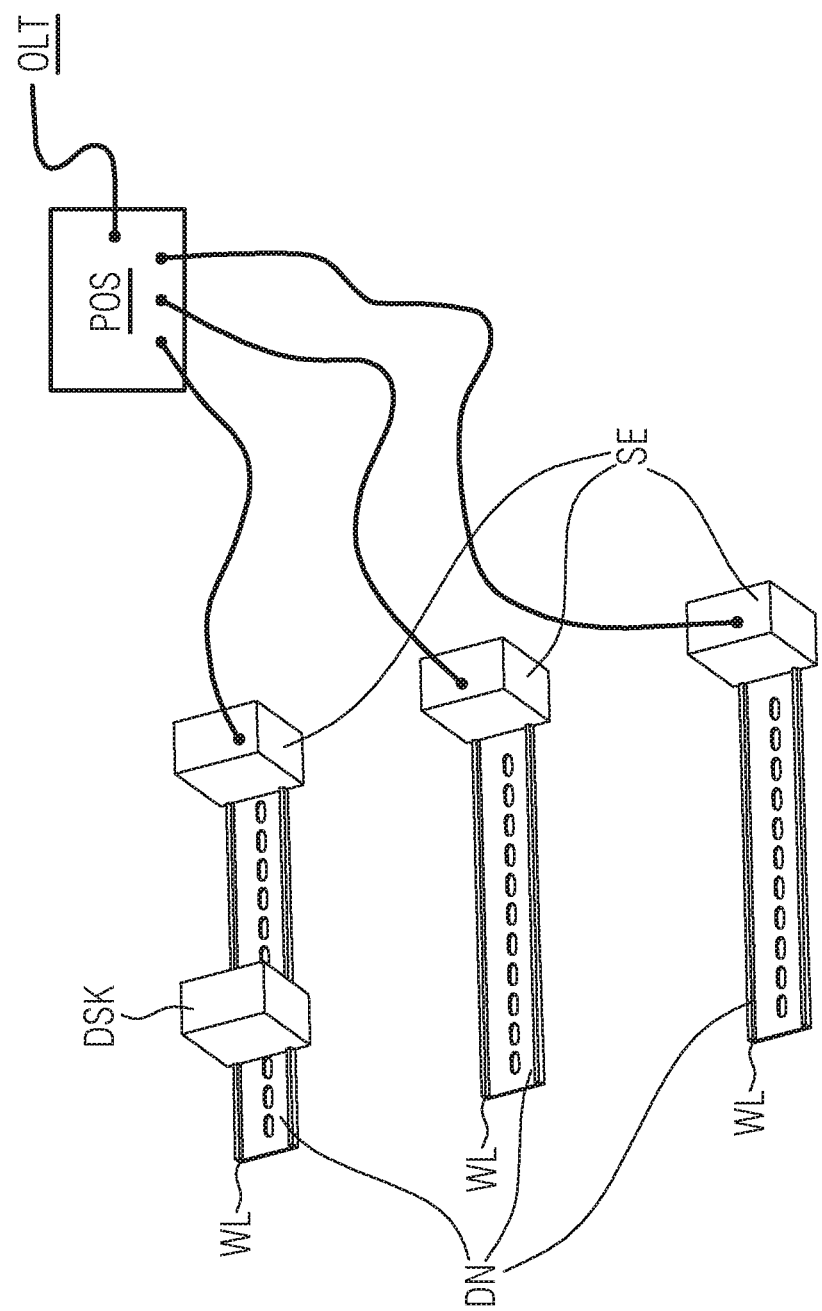
FIG. 22 shows a second embodiment of a light-based communication system for a DIN rail.

FIG. 22 shows a second embodiment of the light-based communication system for a DIN rail. The second embodiment is similar to the first embodiment; therefore, only the differences with respect to the first embodiment are explained. In the second embodiment, the transceiver unit SE of the DIN rail is not equipped with an Ethernet port, but rather with an optical interface. This can be e.g. an S/PDIF interface or a similarly configured optical interface. An optical waveguide is connected via said interface, said optical waveguide in turn being connected to a passive optical splitter POS. The latter collects and/or distributes the signals to all connected optical waveguides and emits them to a further optical waveguide, which leads to an optical terminal OLT and is part of the building installation.

Figure 23:
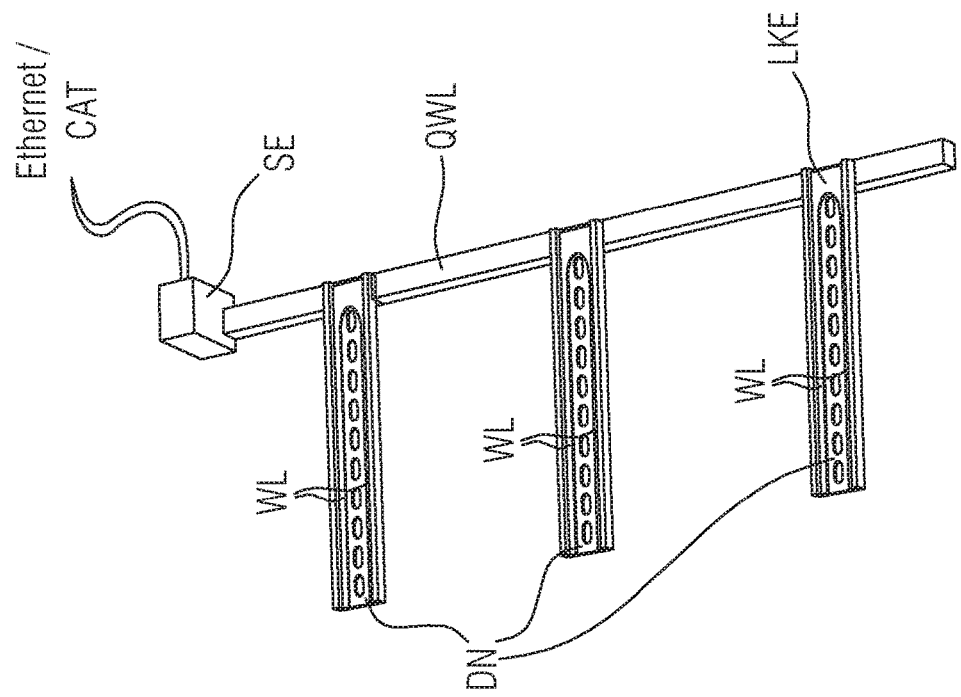
FIG. 23 shows a third embodiment of a light-based communication system for a DIN rail.

FIG. 23 shows a third embodiment of the light-based communication system for a DIN rail. The third embodiment is similar to the first embodiment; therefore, only the differences with regard to the first embodiment are explained. In the third embodiment, not every DIN rail DN has a dedicated transceiver unit SE, rather each DIN rail is connected via a light coupling element LKE to an optical waveguide QWL running transversely between the DIN rails, said optical waveguide in turn being connected to a transceiver unit SE. As in the first embodiment, the transceiver unit SE includes an Ethernet interface.

Figure 24:
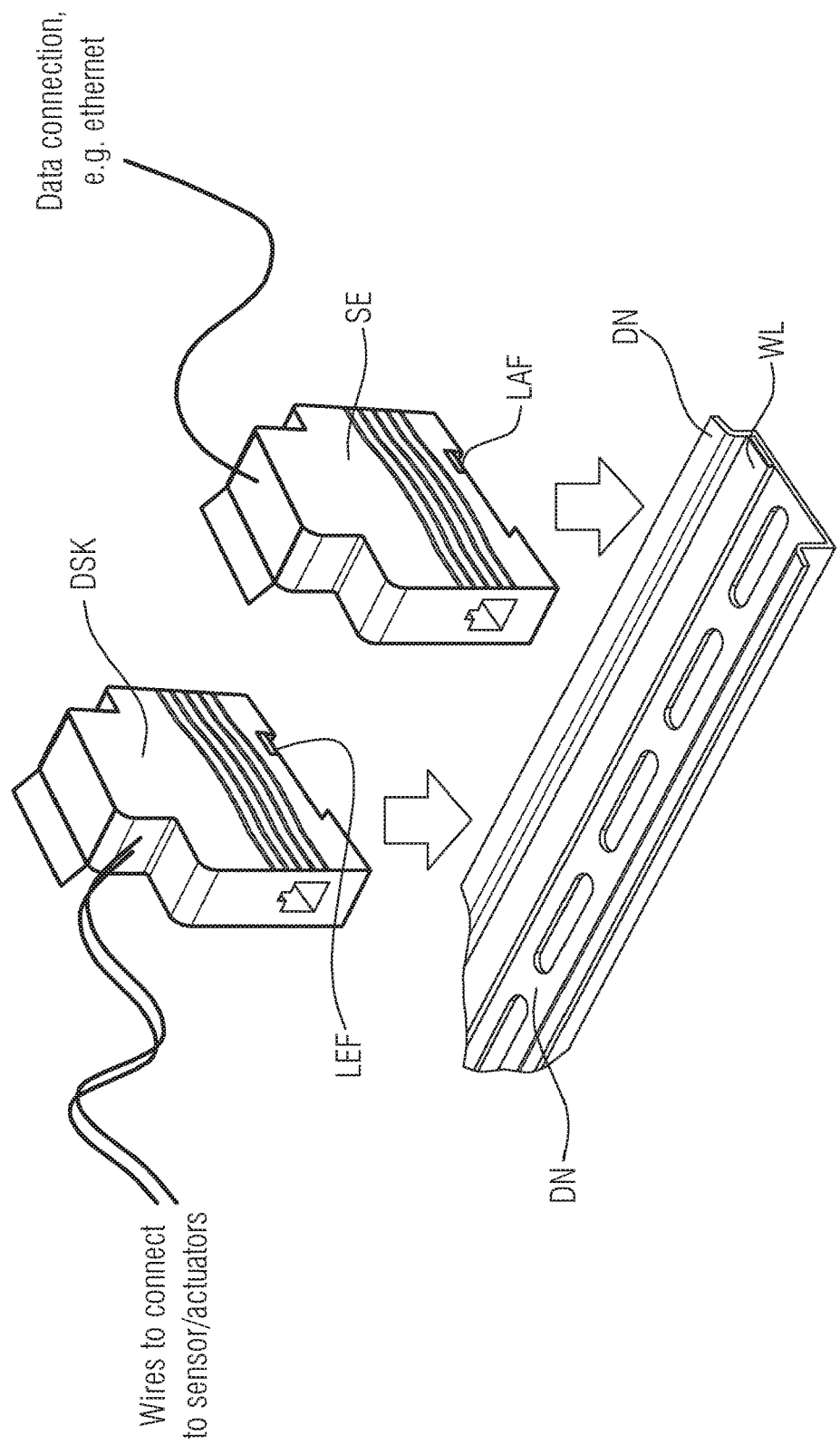
FIG. 24 shows one example of an application of a light-based communication system for a DIN rail.

FIG. 24 shows an example of how such a light-based communication system for a DIN rail can be configured. In this case, the DIN rail DN itself is configured very simply and merely includes an optical waveguide WL in addition to a standard DIN rail. The transceiver unit SE is embodied as a securable component in the form of a simple circuit-breaker and can therefore be attached to any desired location of the DIN rail. For this purpose, the transceiver unit SE includes a light output coupling surface LAF, via which the light is emitted to the optical waveguide WL. A DIN rail component DSK in turn includes a light input coupling surface LEF, via which the light from the optical waveguide WL is emitted to the DIN rail component DSK. The DIN rail component DSK may include further interfaces for sensors or actuators. By virtue of the fact that the transceiver unit SE is embodied as a freely positionable component, the system becomes very flexible in use and cost-effective in production.

FIG. 25 shows a first and a second embodiment of a DIN rail upgraded for light-based communication. In the case of the first embodiment, one optical waveguide WL is led along one inner side of the DIN rail. In the case of the second embodiment, on each inner side a respective optical waveguide WL is led along the corresponding inner side of the DIN rail. The two optical waveguides WL have no direct connection to one another; it is thus possible to establish two different channels along the DIN rail.

The direct connection is established in the third embodiment of a DIN rail in FIG. 26; here the optical waveguide WL is configured such that it is arranged on both sides, and couples out the light coupled in by the transceiver unit SE along both inner sides of the DIN rail DN again to the components.

In this case, a further variant can also couple out light at specific locations on the underside of the DIN rail.

Gel Material for Better Coupling

In order to ensure a particularly good coupling between the transceiver unit and the light coupling surface, a gel material having particularly good optical properties can be used as a light coupling element, for example. By virtue of the fact that air is then no longer situated between transceiver unit and light coupling surface, particularly advantageous optical properties can be achieved. It is important in this case for the gel material neither to dry out nor to exhibit particular ageing phenomena. This is important since the light-based communication has to function reliably over a long period of time.

Side Emitting Light Guides

One particular field of application is side emitting light guides since they can be used in diverse ways. Side emitting light guides can be constructed in various ways.

Figure 27:
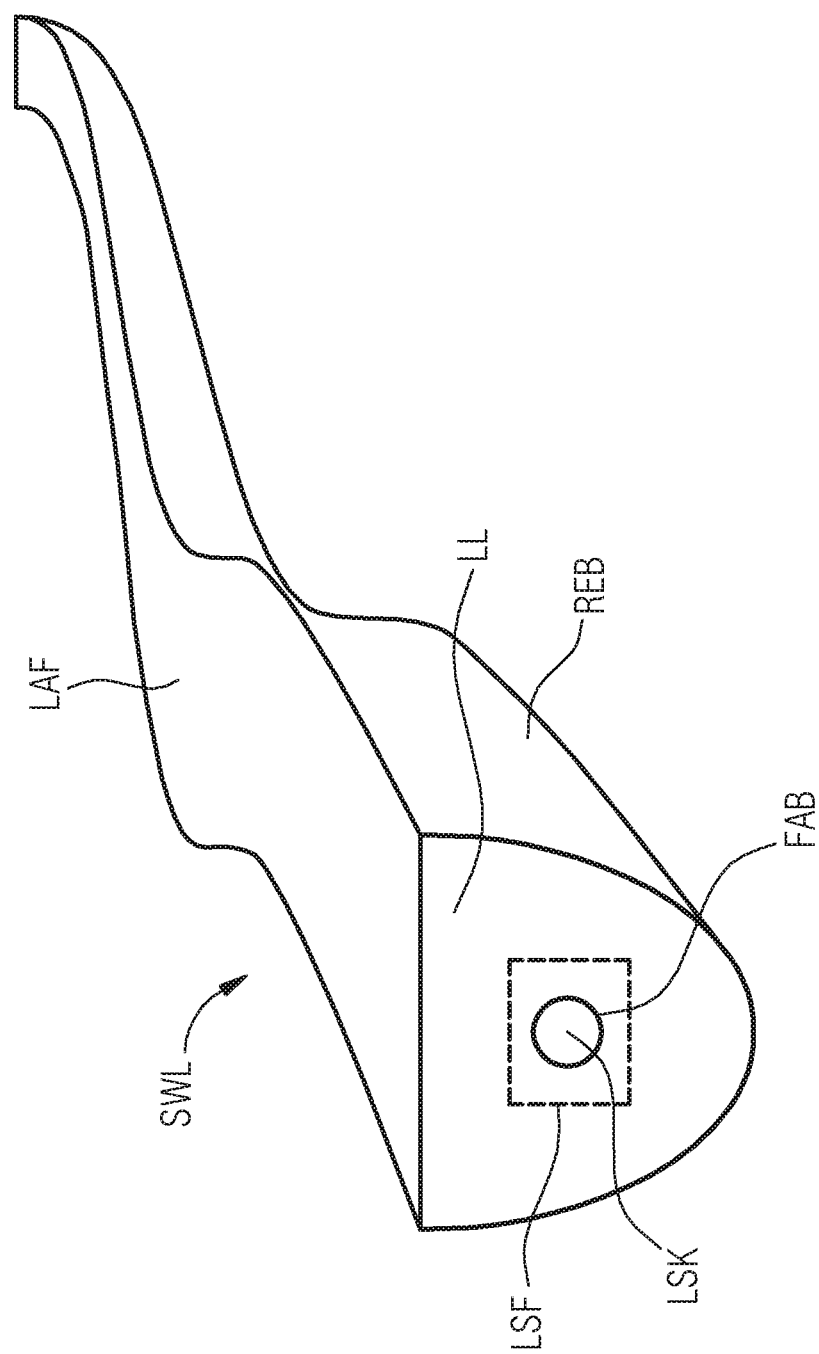
FIG. 27 shows a first embodiment of a side emitting light guide.

FIG. 27 shows a first embodiment of a side emitting optical waveguide SWL. The side emitting optical waveguide SWL includes a light-guiding fiber LSF containing light-scattering structures. These can be e.g. corresponding nanostructures or light-scattering materials, in particular particles, which are embedded into the fiber. The fiber itself can be composed of glass or of a light-guiding polymer, such as e.g. PMMA. In the present embodiment, the fiber core LSK is composed of glass and has a coating FAB composed of PMMA. Both together produce the light-scattering fiber LSF. The latter is embedded into a light guide LL. The light guide itself can in turn consist of a polymer that guides light well, such as PMMA, PVC or polycarbonate. The light guide LL has a paraboloidal shape. In this case, the exterior of the parabola is provided with a reflective coating REB, such that the light guide corresponds to an elongated paraboloidal reflector with the light guide as filler. In this case, the light emitted by the light-scattering fiber is reflected by the reflective layer to the light exit surface LAF, via which it is then emitted by the optical waveguide. The entire arrangement is then referred to as optical waveguide WL. By virtue of the paraboloidal shape, the light is emitted virtually perpendicularly to the surface of the light exit surface LAF.

Figure 28:
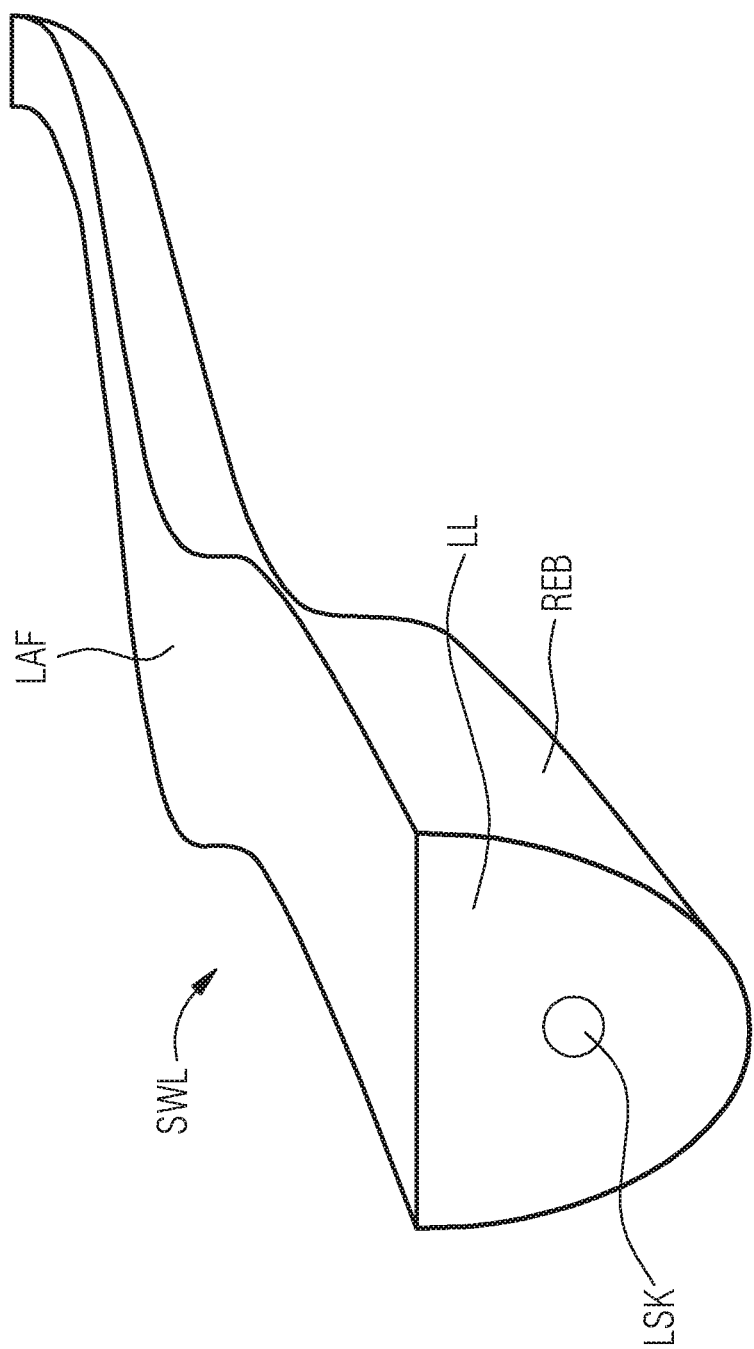
FIG. 28 shows a second embodiment of a side emitting light guide.

FIG. 28 shows a second embodiment of a side emitting optical waveguide SWL. The second embodiment is similar to the first embodiment; therefore, only the differences with respect to the first embodiment are described. In the second embodiment, the light-guiding fiber LSF has no coating FAB, but rather consists only of the light-scattering fiber core LSK. In this case, the light guide LL itself already serves as a coating of the light-scattering fiber core LSK. As described above, said light guide can be composed of a polymer that guides light well, such as e.g. PMMA, PVC or polycarbonate.

Figure 29:
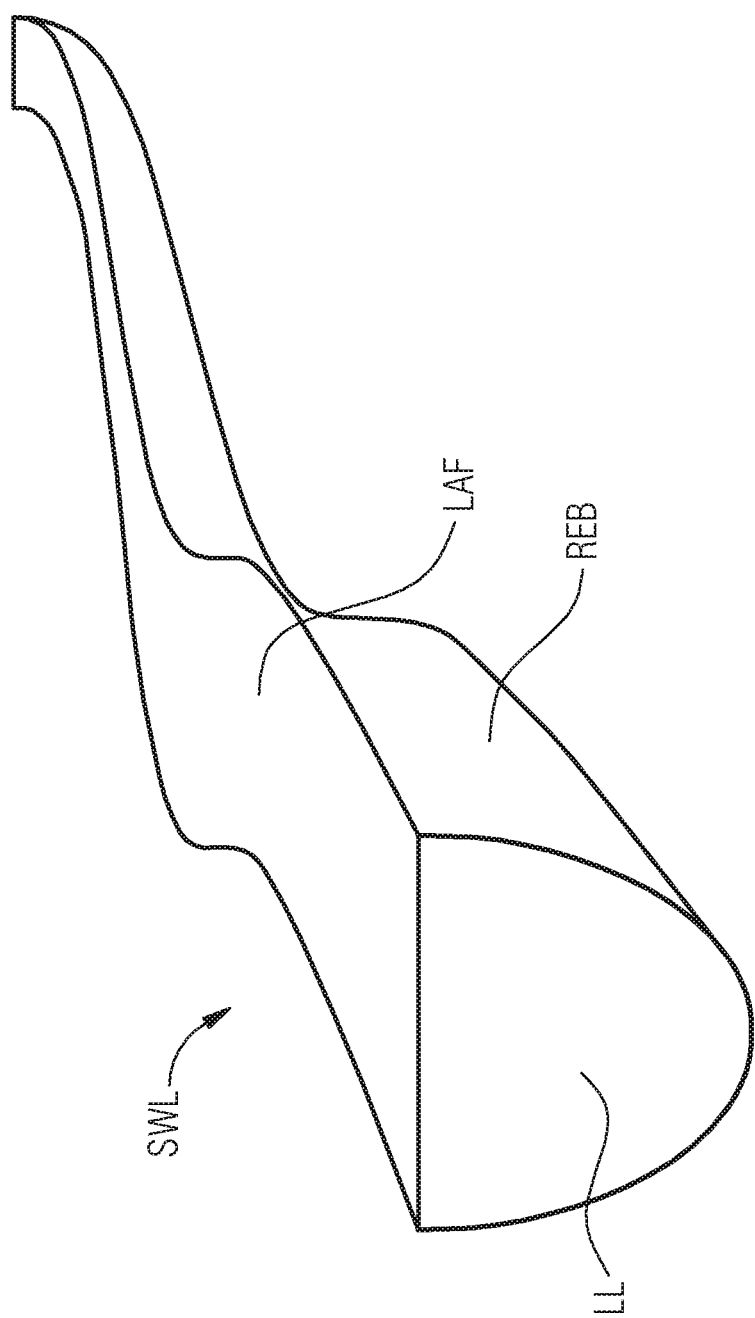
FIG. 29 shows a third embodiment of a side emitting light guide.

FIG. 29 shows a third, further simplified embodiment of the side emitting optical waveguide SWL. The third embodiment is similar to the second embodiment; therefore, only the differences with respect to the second embodiment are described. A light-scattering light-guiding fiber is completely dispensed with in the third embodiment. The optical waveguide WL thus consists of the light guide LL, the reflective coating REB on the outer surface of the parabola, and a coating LAF on the light-emitting surface of the parabola. The coating of the light exit surface LAF can be e.g. a fluorescent polymer. The light guide LL includes light-scattering structures such as nanostructures or light-scattering embedded particles, thereby avoiding the necessary light scattering that is necessary for a side emitter.

FIG. 30 shows two different variants of the third embodiment of the side emitting optical waveguide SWL. The first variant is that from FIG. 29; therefore, it will not be described again. Here the special (polymer) coating is applied only on the light exit surface LAF. The second variant, illustrated underneath, differs from the variant on the left in that the special coating is applied not only on the light exit surface LAF, but rather on the entire surface of the light guide LL. In the region of the paraboloid, once again the reflective coating REB is then applied on the special polymer coating. The special polymer coating can once again be embodied as fluorescent.

Luminaires Including Side Emitting Light Guides

Figure 31:
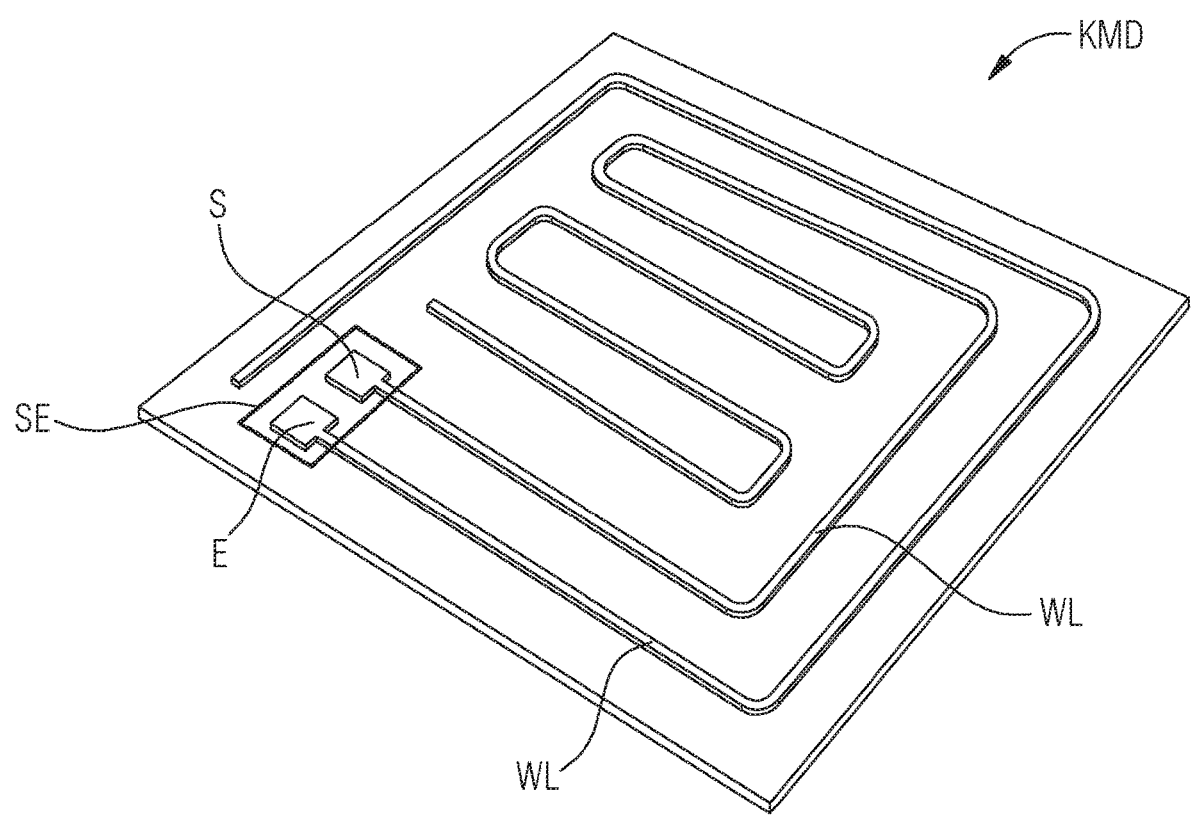
FIG. 31 shows the communication module of a luminaire upgraded for light-based communication.

FIG. 31 shows the communication module of a luminaire upgraded for a light-based communication. Here the light-based communication is intended for subscribers situated below the luminaire e.g. in a line of sight. "Subscribers" here can be terminals used by human beings, such as smartphones, laptops or tablet computers. However, "subscribers" can also be machines, such as robots or self-driving transport devices, which communicate with a base station by way of the light-based communication. The communication module consists of a light-transmissive sheet, on which two side emitting light guides are applied. One side emitting light guide serves for transmitting data, and the other side emitting light guide serves for receiving data. The side emitting light guides are applied on the light-transmissive sheet in a meandering fashion. A transmitter S, consisting of a diode laser and the associated driver, is attached to one of the side emitting light guides. A receiver E consisting of a photodiode with associated electronics is attached to the other side emitting light guide. Transmitter S and receiver E can be combined as a transceiver element SE on a circuit board. The optical waveguide WL for receiving the data is used "oppositely" as it were and guides the incoming light by means of the light-scattering structures at least partly into the optical waveguide WL. There said light is then received by the receiver and converted. The light radiated by the transmitter S is coupled in along the side emitting light guide WL, which in turn couples it out again orthogonally to the elongate extent.

FIG. 32 shows the components of a luminaire upgraded for light-based communication and including a communication module from FIG. 31. In this case, the luminaire consists of an LED module SLM, the communication module KMD and a light-transmissive covering sheet LDS. In this case, the LED module can be a standard LED module. In this case, the LED module can contain a driver; however, the driver can also be fitted externally. In this case, the communication module KMD is arranged downstream of the communication module SLM in the light emission direction and is flooded with visible light by the latter. In this case, the light used for light-based communication is emitted by the side emitting light guides only in the light emission direction or is received from this direction. The light-transmissive sheet serves merely for covering and can be produced from a polymer such as PMMA, PVC or polycarbonate. Glass can likewise be used if only wavelengths for which the glass is transmissive are used.

Further embodiment of a communication system of the priority application 10 2017 209 093.6

Figure 20:
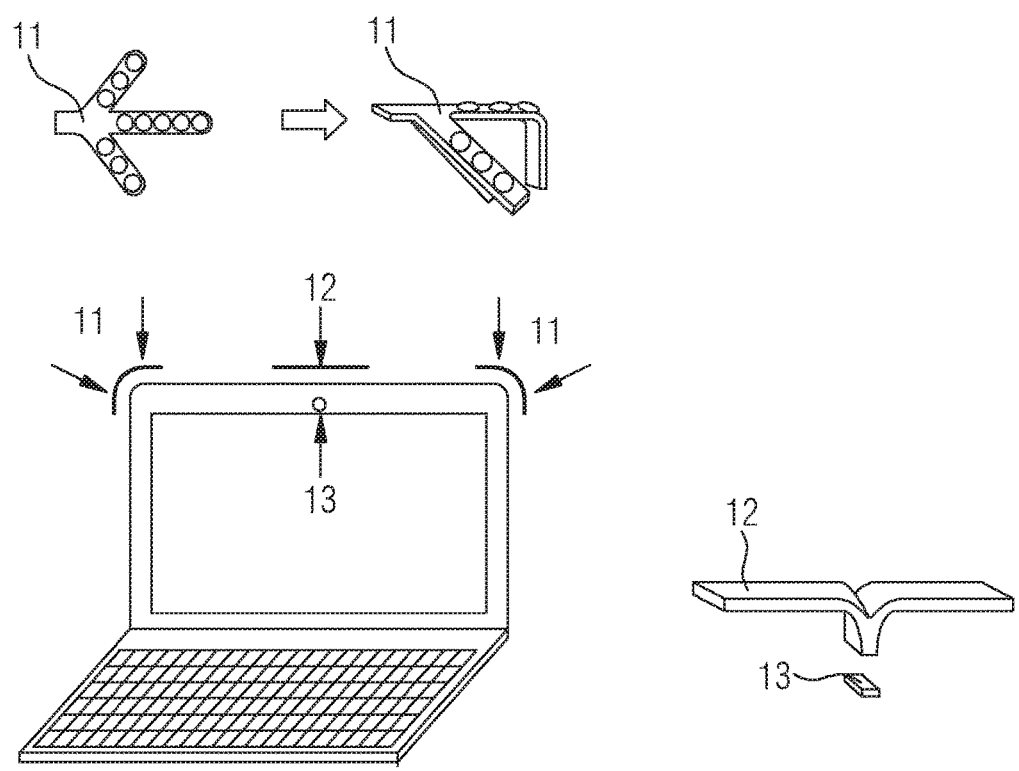
FIG. 20 shows, in a simplified schematic illustration, a further embodiment of a communication system from the priority application 10 2017 209 093.6.

FIG. 20 shows, in a simplified schematic illustration, a further embodiment of a communication system of the priority application 10 2017 209 093.6. Said priority application is likewise concerned with a light-based communication system but for somewhat different fields of application outside the above-described specific embodiments for robot joints.

The priority application is based on the insight that the reliable provision of an optical data transmission for a mobile communication device necessitates a multidirectional transmitting/receiving characteristic, which requires a complex and interference-immune electrical construction in the case of a high data transmission rate that is indispensable in certain applications and in the case of transmitting/ receiving elements that are to be arranged in a locally distributed manner. Precisely with regard to this aspect, an improvement can be achieved by virtue of the fact that, instead of the spatial distribution of radiofrequency electrical signals between transmitting/receiving elements arranged spatially separately, the electrical radiofrequency analog signals are provided centrally at a single location, for example a ceiling luminaire, in combination with a suitably embodied light guide arrangement, which enables a simpler and interference-immune construction.

In a further configuration of the priority application mentioned, the light guide body has a rod-shaped or strip-shaped basic shape and terminates in a branched manner in the shape of a fan at least toward one end of the light guide body 11. As shown in FIG. 20, the individual ends branch, and thus like individual fingers form the termination at least at one side of the light guide body in the main light guiding direction. In the exemplary embodiment in FIG. 20, the light guide body 11 branches in a three-fingered configuration, the arrangement of the fingers resembling a bird's claw. In the case of an embodiment including flexible material for the light guide body 11, fingers of this type can for example be placed around the corners of a laptop display and secured there. In this case, the individual fingers are each occupied by at least one pair including lens element and associated deflection element. It goes without saying that at the branching the main light-guiding direction is divided in accordance with the number of fingers.

In the case of the laptop display, the coupling element 12 is arranged on the top side of the display, and the optoelectronic interface component 13 is arranged on the front side of the display frame. The optoelectronic interface component here is the built-in webcam in the laptop with the associated status LED.

Busbar System with Light-Based Communication

A busbar system with light-based communication is proposed in the following figures.

Busbar systems for illumination are widely known. Conventional busbar systems, in the minimum configuration, include means for providing the required voltage for the illuminants connected to the busbar system.

Besides the conductors for the energy supply, more professional busbar systems have further conductor systems for driving the components connected to the busbar system. These components can be illumination components, but also other components necessary for energy-saving room management. Since the trend nowadays is toward IoT (Internet of Things), modern busbar systems are designed to provide not only known functions, such as providing supply powers, driving actuators, and forwarding sensor data, but also advanced functions such as network functions, for example.

The provision of network functions is problematic, however, since all modern network standards necessitate star cabling of the components with a central router or switch. This is not feasible for a busbar system in which a component can be fitted at any desired location. In an advanced busbar system, every component fitted to any location of the busbar must have access to the network. This hampers the use of traditional Ethernet cabling, or possibly completely precludes the use. Furthermore, Ethernet cabling uses a relatively complex connection technology (which accordingly is also susceptible to interference), which entails further difficulties and also costs.

Figure 33:
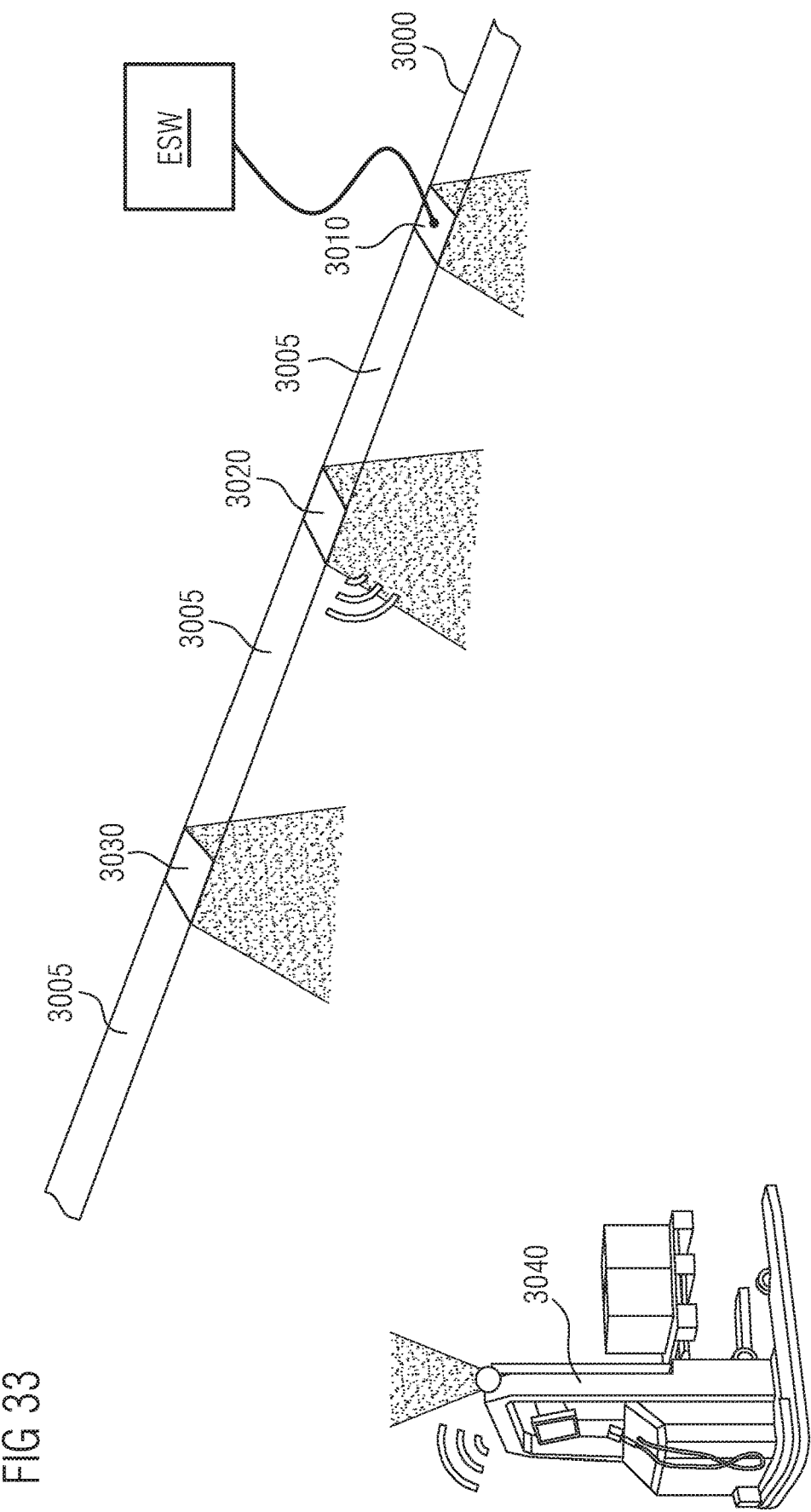
FIG. 33 shows a busbar system with light-based communication.

In order to avoid this problem, it is proposed to integrate light-based communication into the busbar system. FIG. 33 shows such a busbar system having integrated light-based communication. A busbar 3000 includes luminous elements 3005 fitted at regular intervals on the busbar. Further elements are fitted between said luminous elements 3005, said further elements establishing a light-based communication network for terminals. This includes a feed-in point 3010 for light-based communication, which includes firstly elements for light-based communication and secondly an (Ethernet) connection for connecting to an Internet-based local network. An access point 3020 for light-based communication and for radiocommunication is situated elsewhere on the busbar. An access point 3030 for purely light-based communication is situated at a further location of the busbar. All these access points 3010, 3020, and 3030 radiate light LT for light-based communication downward. This light differs from the light of the luminous elements 3005 in that it is correspondingly modulated in order to establish light-based communication. Furthermore, the light used for the communication can have different wavelengths than the visible light used for the illumination. By way of example, the light used for light-based communication can be in the infrared or in the ultraviolet range. However, light visible to human beings can also be used for light-based communication, of course. If a plurality of channels are intended to be used for light-based communication, then it is possible to use for example orthogonal channels in the range of visible light which have the colors red, green and blue. As a result of the different wavelengths of these light colors, the respective channels interfere only very little with one another. With a plurality of light-based channels, firstly the transmission rate can be increased and, secondly, a protocol with additional redundancy can be used, which protocol sends the data simultaneously via all three channels, such that in the event of poor reception of one channel, all data can nevertheless be transmitted securely.

The light-based communication provided by the access points 3010, 3020 and 3030 can be used by a terminal 3040, for example, which is controlled thereby and/or provides data.

Figure 34:
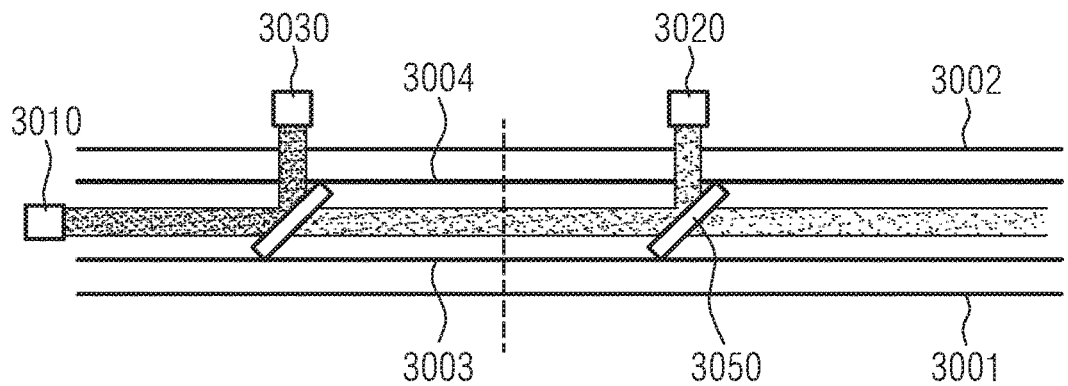
FIG. 34 shows a first embodiment of the busbar system with light-based communication including air as light-guiding medium and semitransparent mirrors for output coupling.

FIG. 34 shows a first embodiment of the busbar system having light-based communication. In this first embodiment, light-based communication is effected through the air with the aid of semitransparent mirrors for coupling out the light to the access points. The network access point 3010 is fitted to a longitudinal side of the busbar system, and transmits and also receives the light-based data within and along the busbar 3000. The access points 3020 and 3030 are fitted to specific locations of the busbar. At these locations, within the busbar, a respective semitransparent mirror is fitted within the light beam used for light-based communication, said mirror deflecting part of said light beam by 90° toward the outside in the direction of the access points. The semitransparent mirrors deflect part of the light used for light-based communication in the direction of the access point in order to incorporate the latter into the light-based communication network. The necessary supply power of the access points is furthermore implemented via line-based busbar elements 3001 and 3002, via which the electrical supply power for the luminous elements 3005 is also implemented. In a non-limiting embodiment, a respective electrical conductor 3001 and 3002 is fitted on a respective side of the busbar. Since the light-based communication is usually embodied as bidirectional communication, the network access point 3010 includes both a transmitter and a receiver. Each of the access points 3020 and 3030 likewise respectively include a transmitter and a receiver in order to establish bidirectional communication. The light required for the communication is thus reflected in both directions by the mirrors from the network access point 3010 to the access points 3020 and 3030. Part of the light passes through the mirrors 3050 in order to be able to supply the entire length of the busbar with light-based communication. The power of the light radiated by the network access point 3010 must accordingly be dimensioned such that at the other end of the busbar, even after many semitransparent mirrors 3050, there is still enough light at the end of the busbar. The transmissivity of the mirrors 3050 must therefore be dimensioned such that firstly enough light is deflected in the direction of the access points or other components, and secondly enough light passes through the mirror 3050, in order to be able to supply further components along the busbar with light-based communication.

In order to be able to realize the light-based communication as effectively as possible, it is advantageous if the network access point includes a light source that radiates focused light. This can be for example a semiconductor laser or the like. The medium in which the light is relayed is air, as already described above. Therefore, the body 3003 used for light-based communication within the busbar system is ideally a hollow body such as a tube 3003 for example. The semitransparent mirrors 3050 can be arranged at the respective locations within said tube 3003. The arrangement can follow a grid, for example, such that semitransparent mirrors are arranged at regular intervals. If the busbar is designed for said grid, then securing points for busbar modules can be arranged in each case at the locations of said mirrors. This ensures that each module fitted to the busbar is always simultaneously connected to the network as well.

Figure 35:
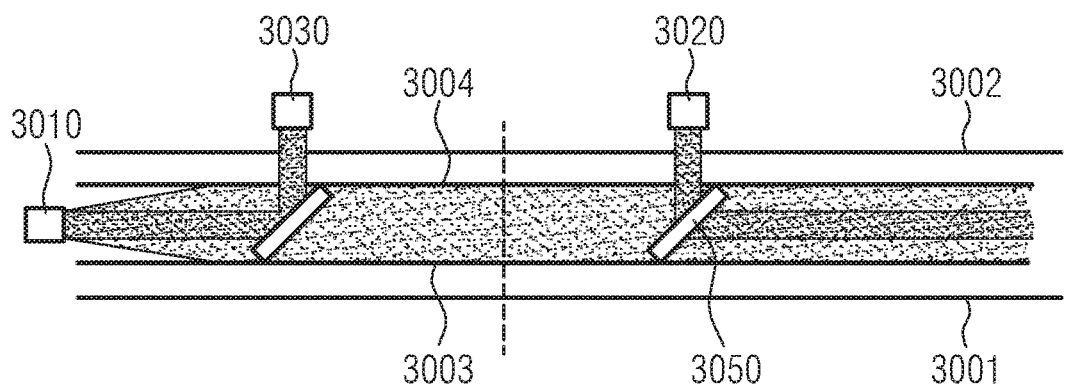
FIG. 35 shows a second embodiment of the light-based busbar system including a tube for guiding light, which is reflectively coated on the inside.

FIG. 35 shows a second embodiment of the busbar system having light-based communication. In contrast to the first embodiment, the tube used for light-based communication has a reflective coating 3004 on the inside. This has the advantage that here a light source that radiates focused light is not necessary for the network access point. By virtue of the inner reflective coating 3004, the light is reflected in the tube 3003 on the inside and the entire tube is thus filled with the light beams. Here, too, the semitransparent mirrors are once again fitted at specific intervals at an angle of 45° on the inside in the tube.

Figure 36:
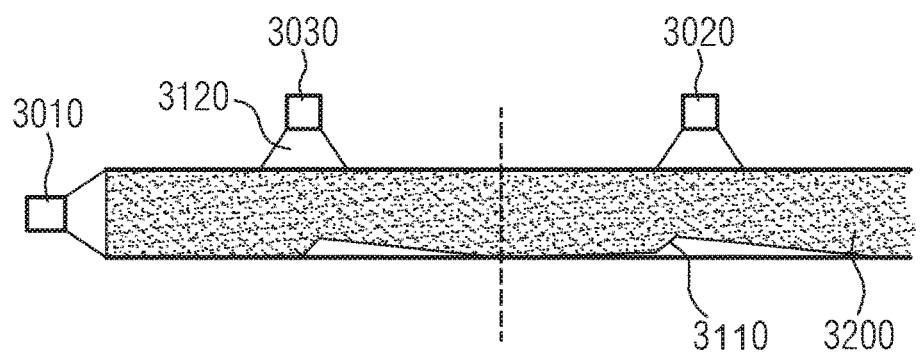
FIG. 36 shows a third embodiment of the busbar system with light-based communication.

FIG. 36 shows a third embodiment of the busbar system having light-based communication. In this embodiment, the light-guiding medium is no longer air, but rather an optical light guide 3100. The latter should be understood to be any suitable light guide, for example acrylic glass, polycarbonate, or the like. The light guide 3100 has an elongate extent, and the network access point 3010 is arranged at the end side of said longitudinal extent. A coupling element 3120 is also arranged between the network access point 3010 and the light guide 3100. The coupling element serves to guide the light radiated by the network access point optimally into the light guide, or to focus the light radiated by other access points 3020, 3030 such that it can be optimally received by the network access point 3010. The light guide 3100 is configured in such a way that at regular intervals it has a constriction having a light-guiding surface 3110, which couples out part of the light propagating in the light guide laterally by 90°. The regular intervals are the same as in the previous example, and the light-guiding surfaces 3110 correspond to the mirrors 3050 in the previous exemplary embodiment. In order that the light coupled out sideward by the light-guiding surfaces 3110 is optimally emitted to the access points, or the light radiated by the access points is optimally coupled into the light guide, coupling elements 3120 are provided here, too, which are situated between the light guide 3100 and the access points 3020 and 3030. In this case, the coupling elements 3120 can be composed of any suitable material, in particular of flexible material that ensures a gapless transition from the light guide to the light-emitting surface of the access point. By way of example, the coupling elements can consist of a light-guiding optical gel arranged between the light guide and the network access points. For this embodiment with the light guide 3100, there is no need for focused light necessarily to be emitted by a laser, for example, and so any type of light source, in particular also an LED, is suitable for the network access points.

Figure 37:
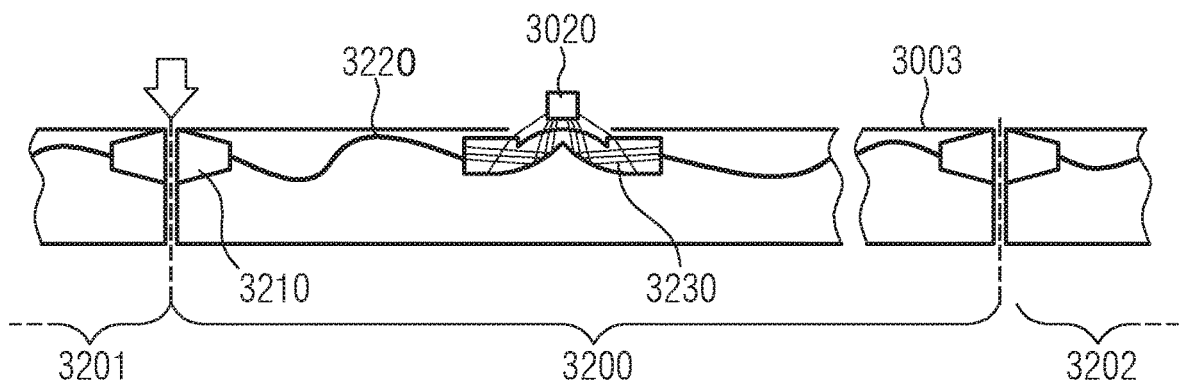
FIG. 37 shows a fourth embodiment of the busbar system with light-based communication.

FIG. 37 shows a fourth embodiment of the busbar system having light-based communication. In this embodiment, a light-guiding fiber 3220 is used for guiding and directing light. The light-guiding fiber 3220 is guided within the tube 3003, and connected to optical elements 3210 at each end. In this embodiment, the system of optical communication for the busbar system is of modular design. Consequently, the tube 3003 is not configured in continuous fashion, but rather in connectable segments. Three connectable segments are shown in FIG. 37. In the center the segment 3200, to the left thereof the segment 3201 and to the right thereof the segment 3202. The segments can be strung together in the longitudinal direction. A respective connection element 3210 is arranged at the end of said segments and collects the light, concentrates it, and couples it into the light-guiding fiber 3220. The connection elements 3210 of respectively adjacent segments 3200, 3201, 3202 are arranged such that they are opposite one another from segment to segment. The connection elements 3210 are configured in such a way that a narrow air gap between the segments has no effects on the efficiency of the system. A respective output coupling element 3230 is arranged in the center of a segment and couples out part of the light coupled into the coupling element 3230 by the light-guiding fiber 3220 sideward in the direction of an access point 3020 arranged there. Of course, the output coupling element also serves as an input coupling element since, after all, bidirectional communication is involved here. The distances between two output coupling points are thus determined here by the length of a segment. In principle, however, it is possible for a segment to have a plurality of output coupling points. The light-guiding fibers 3220 here likewise consist of suitable material, such as, for example, glass fiber or else a plastic fiber such as an optically usable polymer fiber. The connection elements 3210 also consist of suitable optical material, in particular optically highly transmissive plastics such as PMMA or polycarbonate. The coupling elements 3230 also consist of such material. The coupling elements 3230 have a corresponding shape enabling them to couple out part of the light by 90° with respect to the extent of the segments. In this case, the tube 3003 can be filled with a suitable material, or it can also be empty/filled with air.

At the side facing the air gap, the connection elements 3210 can have a corresponding coating serving for bridging the air gap between two segments as efficiently as possible. This can be for example a special coating or a specific surface structure. In the simplest case, the surface can be structured by roughening; however, it is also conceivable for the surface to have a specific predefined structure, for example a facetlike structure. The connection elements themselves can be embodied as an optical concentrator, for example, which couples any trapped light into the light-guiding fibers 3220 very efficiently. However, the connection elements can also be configured in a simple manner if a high efficiency does not appear to be necessary. The light-guiding fibers 3220 can be permanently connected to the connection elements 3210; however, it is also possible to provide a plug connection between these two elements. A plug connection between these elements has the advantage that the segments are configurable quickly and simply. The connection between the light-guiding fibers 3220 and the output coupling elements 3230 can also be embodied as permanent or else be pluggable. In a non-limiting embodiment, either all connections are pluggable, or all connections are permanent. The output coupling element 3230 can be configured optically such that it couples out any light in the direction of the access point, but it can also be configured such that a larger part of the light is guided through, and only a smaller part of the light is coupled out in the direction of the access point.

Figure 38:
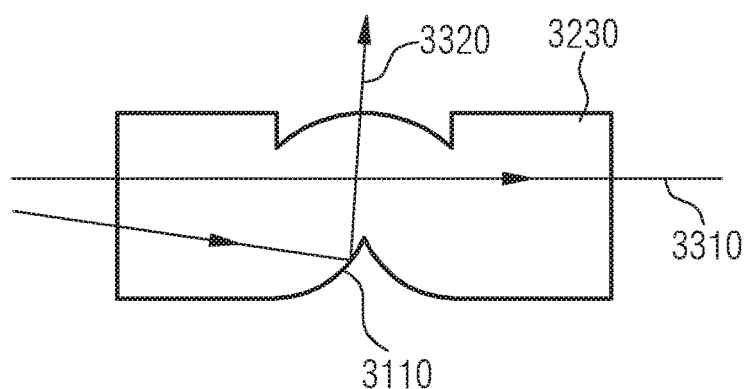
FIG. 38 shows a sectional view of an output coupling element.

FIG. 38 shows a sectional view of an output coupling element 3230 designed to couple out only a small part of the light coupled into the output coupling element 3230 sideward in the direction of the network access point. For this purpose, the output coupling element 3230 is configured such that it has a significant continuous portion through which the light can pass from one side to the other without being impeded; only a relatively small part of the cross section has a light-guiding surface 3110, which couples out this part of the light sideward in the direction of the access point. A large part of the light coupled in thus passes through the output coupling element 3230, as indicated by the arrow 3310. A smaller part of the light coupled in is deflected sideward in the direction of the network access point, as indicated by the arrow 3320. Such an output coupling element is used in the central segments of the arrangement, in the case of which segments it must be ensured that light can always pass in large part from one end of the segment to the other end of the segment.

Figure 39:
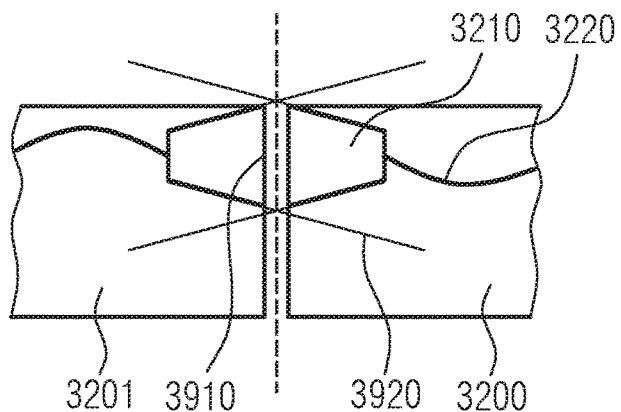
FIG. 39 shows the functioning of the connection elements 3210 in the case of a narrow gap between two segments.

FIG. 39 shows once again the functioning of the connection elements 3210 in the case of a narrow gap between the segments 3200 and 3201. The lines 3920 show the expansion of the light beam such as would emerge from the connection element 3210. This holds true, however, only if the surface 3910 facing the next segment is planar. Specifically, the expansion of the light as illustrated in the lines 3920 takes place only if the light output coupling surface is planar or roughened. By virtue of the fact that only a very narrow air gap is present here, the majority of the light is coupled into the connection element 3210 situated opposite.

Figure 40:
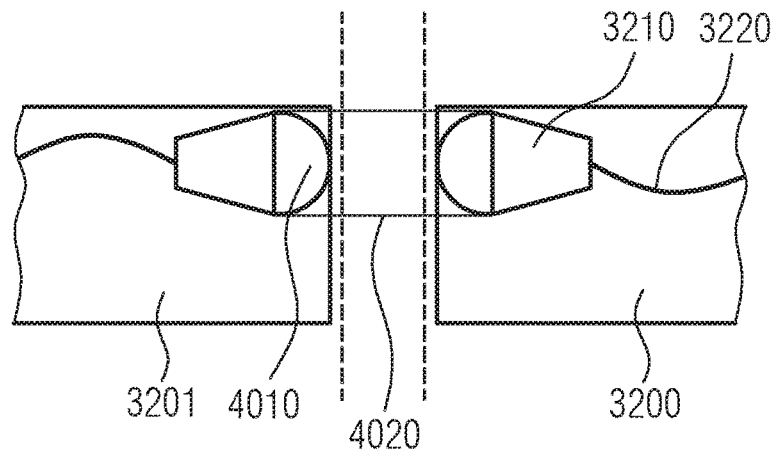
FIG. 40 shows the functioning of the connection elements 3210 in the case of a wide gap between two segments.

FIG. 40 shows the same arrangement, but with a large air gap between the segments 3200 and 3201. It is readily discernible here that, with the same arrangement as in FIG. 39, only a relatively small part of the light would pass into the next segment since much light would be lost laterally as a result of the expansion of the light beam. In order to solve this problem, a concentration lens/converging lens 4010 is provided, which deflects the light and radiates it in a parallel manner in the longitudinal direction of the segment. If both segments are then aligned in the longitudinal direction, a large part of the light can be taken up by the connection element 3210 situated opposite, and can be collected by the concentration lens 4010 also arranged there.

Depending on how the busbar system is configured, an arrangement for the connection of the segments can accordingly be found which utilizes the available light very efficiently for the light-based communication.

Figure 41:
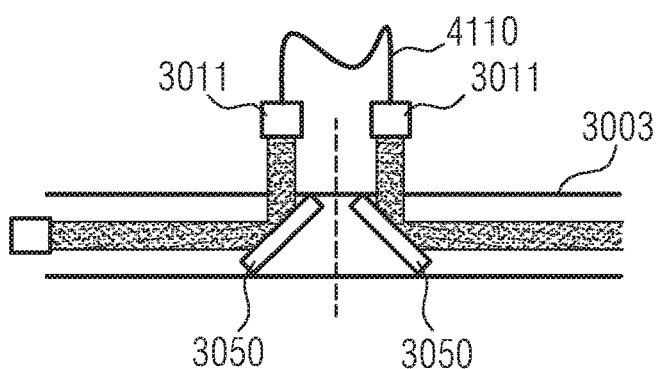
FIG. 41 shows an amplifier location for very long busbar systems.

FIG. 41 shows an amplifier location for very long busbar systems. If busbar systems have a very long elongate extent, it may become necessary to amplify the light used for the light-based communication since in the case of input coupling from one side, and also in the case of input coupling from two sides, under certain circumstances, not enough light arrives at the other end and in the center, respectively.

For this purpose, there is an amplifier location, which is constructed similarly to a network access point 3010. For this purpose, special network access points 3011 are used, which trap the light from one half of the busbar system and convert it and relay it via a data line 4110 to a second network access point 3011, which converts this information into light again and couples it into the other half of the busbar system via a further mirror 3050. The conversion effected in this case can be conversion into an electrical signal, for example. However, the network access point 3011 can likewise be configured merely to amplify the light and to feed it into a light-guiding fiber. This light is once again trapped by a further network access point 3011 and amplified again and then coupled into the other half of the busbar system via the mirror 3050. Any desired data connection, be it optical or electrical, is thus conceivable between the two network access points 3011.

Of course, this arrangement can also be used to connect to one another a plurality of busbars which extend in different spatial directions.

Figure 42:
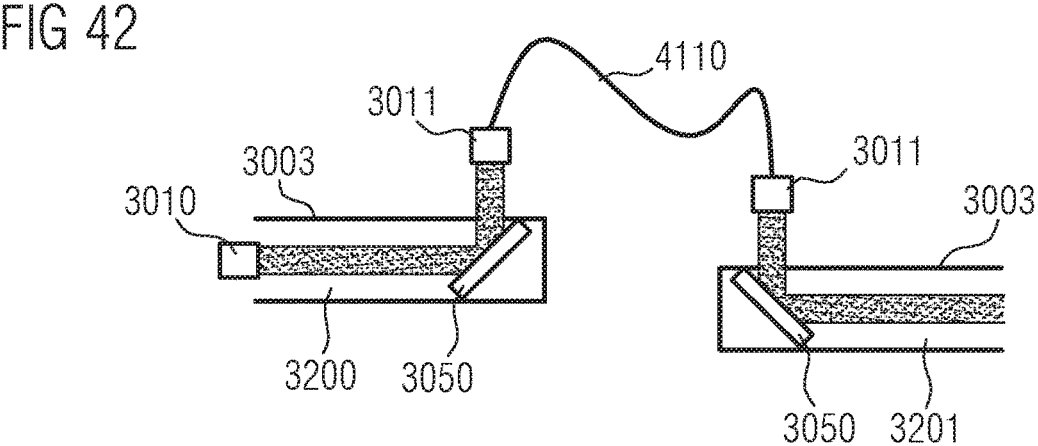
FIG. 42 shows an arrangement in which two busbars that are intended to be coupled together to form a busbar system are not situated in an axis.

FIG. 42 shows an arrangement in which two busbars which are intended to be coupled together to form a busbar system are not situated in an axis. Here the amplifier described above can serve to combine these two busbars to form a busbar system. By virtue of the fact that there is an optical or electrical cable connection between the network access points 3011 of the respective busbars, it is unimportant how the two busbars are arranged with respect to one another.

Figure 43:
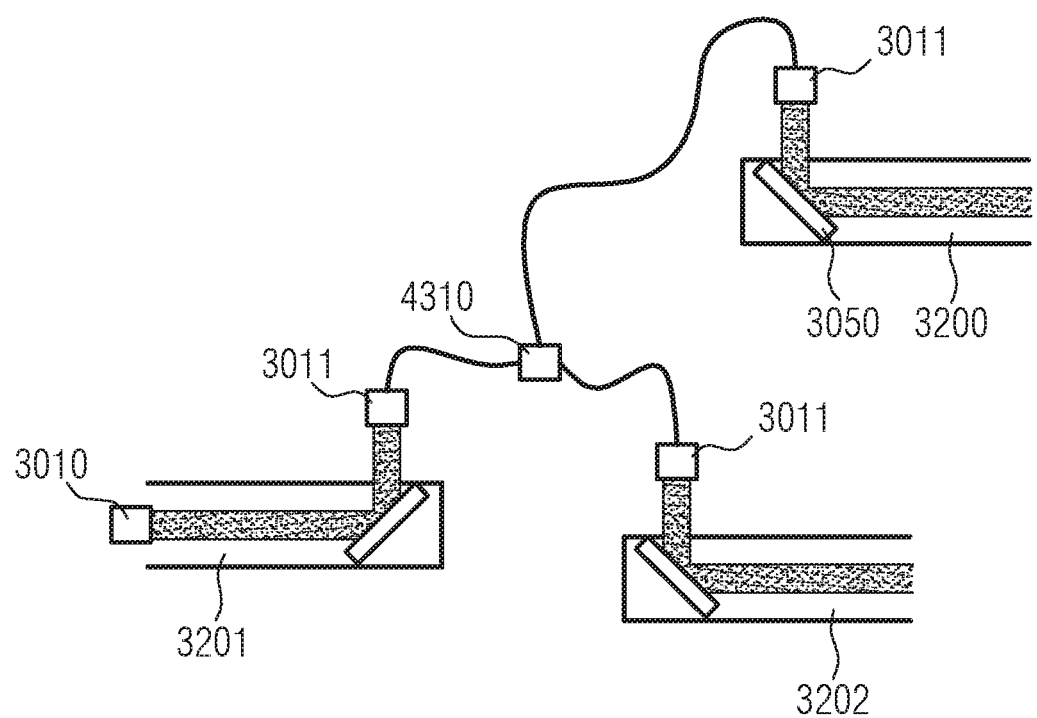
FIG. 43 shows an arrangement in which three busbars are coupled together to form a busbar system.

FIG. 43 shows an arrangement in which three busbars are coupled together to form a busbar system. Each of these three busbars has at its end in each case a mirror 3050 and a network access point 3011, which acts as an amplifier. All three network access points 3011 are electrically or optically connected to a switch 4310 via a cable connection, said switch relaying the signals from each network access point 3011 to each other network access point 3011 of the other busbars. As a result, any information coming from one busbar can pass to the other two busbars. In this case, each of these busbars can be regarded as a segment. Accordingly, one of these three busbars is the segment 3200, a further busbar is the segment 3201, and the third busbar is the segment 3202. All these three segments together form the busbar system 3000. This embodiment is the only one which has star-shaped cabling just like the Ethernet standard. In a non-limiting embodiment, the switch 4310 simultaneously serves as a superordinate network access point for the busbar system.

The disclosure above has been described in order to illustrate the underlying concept on the basis of some exemplary embodiments. In this case, the exemplary embodiments are not restricted to specific combinations of features. Even if some features and configurations have been described only in association with one particular exemplary embodiment or individual exemplary embodiments, they can be combined in each case with other features from other exemplary embodiments. It is likewise conceivable to omit or to add individual presented features or particular configurations in exemplary embodiments, provided that the general technical teaching is still realized.

LIST OF REFERENCE SIGNS

O Orthogonal joint
L Linear joint
R Rotational joint
T Twisting joint

V Revolving joint
LE Input link
LA Output link
LKE Light coupling element
S Transmitter
E Receiver
SE Transceiver element
LSK Light-scattering core
FAB Core coating
LSF Light-scattering fiber
REB Reflective coating
LL Light guide
WL Optical waveguide
SWL Side emitting optical waveguides
QWL Transversely extending optical waveguide
KMD Communication module
LDS Light-transmissive sheet
SLM LED module
LAF Light output coupling surface
LEF Light input coupling surface
BR Direction of motion
LED Optoelectronic element
LT Light
POS Optical splitter
OLT Optical terminal
ESW Ethernet switch
DN DIN rail
SE Transceiver unit
QWL Transversely extending optical waveguide
DSK DIN rail component
3000 Busbar
3005 Luminous elements
3010 Feed-in point with Ethernet connection
3020 Access point with light-based and radio communication
3030 Access point with light-based communication
3040 Terminal
3001 Electrical busbar element
3002 Electrical busbar element
3050 Mirror
3003 Hollow body, e.g. tube
3004 Reflective coating
3100 Optical light guide
3120 Coupling element
3110 Light-guiding surface
3200 Segment
3201 Segment
3202 Segment
3210 Connection element
3220 Light-guiding fiber
3230 Output coupling element
3310 Light passing straight through
3320 Light coupled out
3910 Light input and/or output coupling surface of the connection element
3920 Schematic light cone
4010 Converging lens
4110 Data line
4310 Switch

The invention claimed is:

1. A system for transmitting data comprising:
a transmitter configured to emit light-based signals;
a receiver configured to receive the light-based signals;
at least one medium configured to transmit and direct the light-based signals;
wherein the transmitter and the receiver are positionable relative to one another;
a light coupling element connected to the transmitter and/or the receiver; and
an optical waveguide connected to the light coupling element; wherein the optical waveguide is a side emitter; wherein the optical waveguide comprises a light guide;
wherein one side emitting fiber without an optical cladding is embedded into the light guide, wherein the light guide itself acts as an optical cladding.

2. The system as claimed in claim 1, wherein the optical waveguide comprises a light output coupling surface.

3. The system as claimed in claim 1, further comprising a mechanical joint arranged between the transmitter and the receiver, and wherein the transmitter is connected to an input link of the mechanical joint, and wherein the receiver is connected to an output link of the mechanical joint.

4. The system as claimed in claim 3, wherein the mechanical joint is a robot joint.

5. The system as claimed in claim 3, wherein the mechanical joint is lockable or fixable.

6. The system as claimed in claim 3, wherein the mechanical joint is configured as a rail.

7. The system as claimed in claim 3, wherein the transmitter and/or the receiver are connected to a light coupling element that is connected to an optical guide; wherein the optical waveguide is configured spatially in such a way that it correlates with the motion of the mechanical joint.

8. The system as claimed in claim 7, wherein the optical waveguide is embodied in ring-shaped fashion in the case of a rotary motion of the mechanical joint, and is embodied in rod-shaped fashion in the case of a translational motion of the mechanical joint.

9. The system as claimed in claim 3, wherein the input link, the mechanical joint, and the output link are hollow; and wherein the transmitter and the receiver are arranged in such a way that the light-emitted signals are emitted internally through the input link, the mechanical joint, and the output link from the transmitter to the receiver.

10. The system as claimed in claim 1, wherein the cross section of the optical waveguide has a parabolic or compound parabolic shape.

11. The system as claimed in claim 1, wherein the optical waveguide has an elongated shape.

12. The system as claimed in claim 1, wherein the optical waveguide wholly or partly comprises an optical coating in order to improve the guiding of the light in the optical waveguide.

13. The system as claimed in claim 1, wherein the optical waveguide is partly reflectively coated.

14. The system as claimed in claim 1, wherein one side emitting fiber without an optical cladding is embedded into the light guide.

15. The system as claimed in claim 1, wherein a plurality of side emitting fibers are embedded into the light guide.

16. The system as claimed in claim 1, wherein a plurality of side emitting fibers without an optical cladding are embedded into the light guide.

17. The system as claimed in claim 1, wherein the optical waveguide comprises light-scattering structures.

18. A system for transmitting data comprising:
a transmitter configured to emit light-based signals;
a receiver configured to receive the light-based signals;
at least one medium configured to transmit and direct the light-based signals;
wherein the transmitter and the receiver are positionable relative to one another;

a light coupling element connected to the transmitter and/or the receiver; and
an optical waveguide connected to the light coupling element; wherein the optical waveguide is a side emitter; wherein the optical waveguide has an elongated shape with fingerlike branchings.

19. The system as claimed in claim 18, further comprising a mechanical joint arranged between the transmitter and the receiver, and wherein the transmitter is connected to an input link of the mechanical joint, and wherein the receiver is connected to an output link of the mechanical joint.

\* \* \* \* \*